Sept. 15, 1959 P. O. DAHLMAN ET AL 2,904,634

AUTOMATIC TELEPHONE SYSTEM

Filed April 14, 1954 10 Sheets-Sheet 1

*INVENTORS.*
PER O. DAHLMAN
DORSEY D. SIMMONS
*BY* Brown, Jackson, Boettcher & Dienner
ATTYS.

INVENTORS.
PER O. DAHLMAN
DORSEY D. SIMMONS
BY Brown, Jackson, Boettcher & Dienner
ATTYS.

INVENTORS.
PER O. DAHLMAN
DORSEY D. SIMMONS
BY
ATTYS.

Sept. 15, 1959 P. O. DAHLMAN ET AL 2,904,634

AUTOMATIC TELEPHONE SYSTEM

Filed April 14, 1954 10 Sheets-Sheet 4

INVENTORS.
PER O. DAHLMAN
DORSEY D. SIMMONS
BY Brown, Jackson, Boettcher & Dienner
ATTYS.

INVENTORS.
PER O. DAHLMAN
DORSEY D. SIMMONS
BY Brown, Jackson, Boettcher & Dienner
ATTYS.

INVENTORS.
PER O. DAHLMAN
DORSEY D. SIMMONS
BY Brown, Jackson, Boettcher & Dienner
ATTYS.

AUTOMATIC TELEPHONE SYSTEM

Filed April 14, 1954

10 Sheets-Sheet 7

INVENTORS.
PER O. DAHLMAN
DORSEY D. SIMMONS
BY Brown, Jackson, Boettcher & Dienner
ATTYS.

INVENTORS.
PER O. DAHLMAN
DORSEY D. SIMMONS
BY Mason, Jackson, Brettner & Dienner
ATTYS.

INVENTORS.
PER O. DAHLMAN
DORSEY D. SIMMONS
BY Brown, Jackson, Boettcher & Dienner
ATTYS.

AUTOMATIC TELEPHONE SYSTEM

Filed April 14, 1954 10 Sheets-Sheet 10

INVENTORS.
PER O. DAHLMAN
DORSEY D. SIMMONS
BY Brown, Jackson, Boettcher & Dienner
ATTYS.

United States Patent Office 2,904,634
Patented Sept. 15, 1959

2,904,634

AUTOMATIC TELEPHONE SYSTEM

Per O. Dahlman and Dorsey D. Simmons, Galion, Ohio, assignors to North Electric Company, a corporation of Ohio Application April 14, 1954, Serial No. 423,148

37 Claims. (Cl. 179—18)

The present invention is directed to an automatic telephone system, and particularly to novel switching equipment for use therein.

In certain types of industrial and military automatic telephone system installations, it is not uncommon to experience load conditions for temporary periods which are far in excess of the intended capacity of the equipment, and during such periods serious operating problems may arise. Whereas the provision of additional equipment would satisfactorily solve such overload condition in many instances, the temporary nature of the load is frequently such as to render the addition of the equipment impractical from a cost standpoint. In other types of installations, as for example, in mobile telephone systems utilized in military field maneuvers or in civilian areas distressed as a result of floods, tornadoes, etc., the line capacity required is frequently not ascertainable prior to the time the need arises. It is apparent therefore that there is a definite need for a basic system which may be readily expanded as the occasion arises, and it is a primary object of the invention to provide an expandable type telephone system which fulfills such need.

It is a specific object of the invention to provide a system in which one basic system may be coupled to another system of like construction by a simple plug in cable and jack arrangement, and in which the system for providing the added capacity is so compact and light as to permit the mobile use thereof. The basic arrangement illustrated herein, for example, is a ten link-fifty line system which may be trailer mounted, and which may be readily expanded to a twenty link-one hundred line arrangement by the simple expedient of connecting a second trailer mounted system thereto with plug ended cables.

In other instances the preferred arrangement may comprise mounting of two fifty line-ten link switchboards in a single trailer, and at times utilizing same as two separate systems, and at other times as a single one hundred line-twenty link arrangement.

The accomplishment of a system having these operating features and advantages requires the provision of basic switching units which are comprised of a minimum number of operating elements while yet retaining the reliability of operation demanded of a conventional automatic telephone system. It is a specific object of this invention therefore to provide a novel and simplified line circuit arrangement, a more compact and simplified guard circuit arrangement, and new and novel allotter equipment.

The novel line circuit of the disclosure is basically comprised of two relays, a three winding line relay and a three winding cut-off relay which accomplishes each of the three functions normally assigned to line circuits; that is, call initiation, cut-off and lock-out, including reverting call. As more fully shown hereinafter, the two relay line circuit effects the provision of these functions in a manner which is expeditious. Of further import is the manner in which the system utilizes the P-wire circuit of a subscriber to identify the calling line of a group, the novel two relay line circuit effecting marking thereof with call initiation. In this manner the units marking lead and associated circuitry required for each line circuit in conventional type systems is eliminated, and a corresponding reduction in cost and space is effected.

There has also been provided herewith a novel guard circuit arrangement which is operative to effect connection of a calling line to a link, as preselected by the allotter, through the use of a minimum amount of equipment. More specifically, the guard arrangement comprises a ten relay guard set which is utilized both in the determination of the tens group and the calling line of the group. The utilization of a basic ten unit guard system in lieu of the twenty relays used in conventional type system is, of course, also basic to the provision of a more simplified type telephone system, and fulfills a specific object of the present invention.

The novel guard circuit operates hand-in-hand with the line circuit which marks the P-wire of a calling line for identification purposes. That is, as schematically indicated in Figure 1, with initiation of a call the line circuit seizes a link preselected by the allotter, and the link in turn signals the guard circuit. The guard circuit examines the tens marking leads in the system to determine the group of lines which has initiated the call, and effects operation of the corresponding tens relays of the finder switch in the seized link. The link line finder thereupon operates to extend the P-wire circuits of the calling line group to the guard circuit, and signals same to proceed in the selection of the particular line of the group which has initiated the call. The guard circuit examines the P-wire circuits of the selected group and effects operation of the appropriate units relay in the finder switch of the seized link. The connection is thus extended from the calling subscriber line to the call extending equipment in the link. Novel guard release means permit restoration of the guard circuit at times by the link and at other times by the allotters.

The guard circuit includes a number of novel timing arrangements which effect bypass of a link in the event that a predetermined time period elapses after seizure of a link without connection of the preselected link to the calling line. The allotter unit also includes a timing arrangement which is operative to effect bypassing of a link in the event that a calling line attempts to seize a preselected one of the links for a predetermined time period without success.

In one embodiment the guard timing circuit signals the seized link, and the link signals the allotter to accomplish link bypass. In a second embodiment the guard timing circuit signals the allotter circuit directly to achieve link bypass. Reset of the guard timing means following a normal call is effected by the link in each of these arrangements. In a third embodiment the guard circuit signals the allotter directly, and the allotter effects resetting of the timing means following each seizure of an idle link by a calling subscriber.

The automatic telephone system also includes means for connecting a single one of these novel simplified guard circuits to serve the arrangement as interconnected to provide a twenty link-hundred line system. Normally two guard circuits are utilized for such purpose, it being apparent therefrom that the system is extremely flexible in its adaptation.

Other features and advantages of the novel guard circuit arrangement are set forth hereinafter.

The novel allotter of the disclosure is connected to preselect in sequence the idle ones of an associated group of links, the links being connected by marking conductors to the allotter to indicate the operating condition thereof to the allotter at all times. The allotter basically comprises a stepping chain which is operative with receipt of a signal from a link as seized to step over the marking conductors of the associated links in sequence in search for an idle link, and upon the location of an idle link in the sequence, to prepare same for seizure by the next calling subscriber. As a cycle is completed, a transfer relay effects recycling of the equipment, and a cyclic search is once more initiated. In the event that all of the links have been seized, the calling subscriber is informed and associated equipment is operated to prepare a recording circuit so that a record may be provided of each call attempted subsequent thereto.

Each allotter also includes novel fault detection means which detect faulty equipment operation and condition the equipment for use even though such fault exists. For example, should an open circuit condition exist which prevents seizure of a particular link by a calling subscriber, the allotter, after the elapse of a predetermined time period, signals its stepping chain to bypass such link and to proceed in search of a further idle link. A second protective arrangement in the system is operative in the event that a relay in the allotter stepping chain becomes inoperative, to bypass the steps following same in the sequence, and to effect recycling of the chain so that the steps prior thereto in the sequence may still be utilized by the calling subscribers. As shown hereinafter, this feature is especially desirable in the event that the arrangement is connected with a second allotter to provide a twenty link-one hundred line arrangement, it being apparent that in such case the equipment will effect transfer of the selecting operation to the next allotter, whereby the next allotter may be used in a normal manner, and as it completes its cycle, may provide reuse of the steps in the sequence prior to the inoperative step of the first allotter.

As indicated hereinbefore, each allotter includes a novel cable and plug-in jack arrangement for connecting same to a "mirror image" thereof, whereby a twenty link-one hundred line system is provided. As brought out more fully hereinafter, in such arrangement each allotter is rendered effective according to a predetermined plan to examine the links associated therewith for idle links and to preselect same for use by the calling subscribers. As a cycle of an allotter is completed, the allotter tests to determine the condition of the links in the several allotters, and effects energization of a particular allotter in accordance with the indicated availability of the links thereat.

More specifically, it is apparent that as the first allotter to be energized locates the final idle link associated therewith, the equipment must test for the existence of four possible conditions:

(*a*) The availability of links in both allotters;

(*b*) The availability of links in the second allotter alone;

(*c*) The availability of links in the first allotter alone;

(*d*) No links available in either allotter.

It is of course apparent that the same four conditions may exist when the last idle link of the second allotter is seized. The novel manner in which the allotter equipment tests for these conditions (and effects further operation in accordance with the particular condition which exists) is more fully described hereinafter.

These and other advantages and features of the novel automatic telephone system will become apparent with reference to the following specification, claims and drawings in which:

Figure 3:
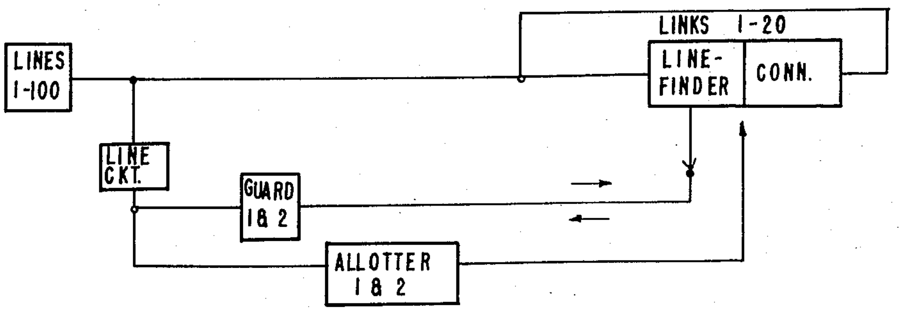
Figure 3 illustrates in block form the operating arrangement effected with connection of the equipment as shown in Figure 2.
Figure 3A:
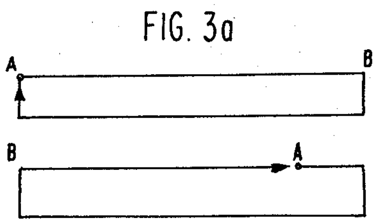
Figure 4:
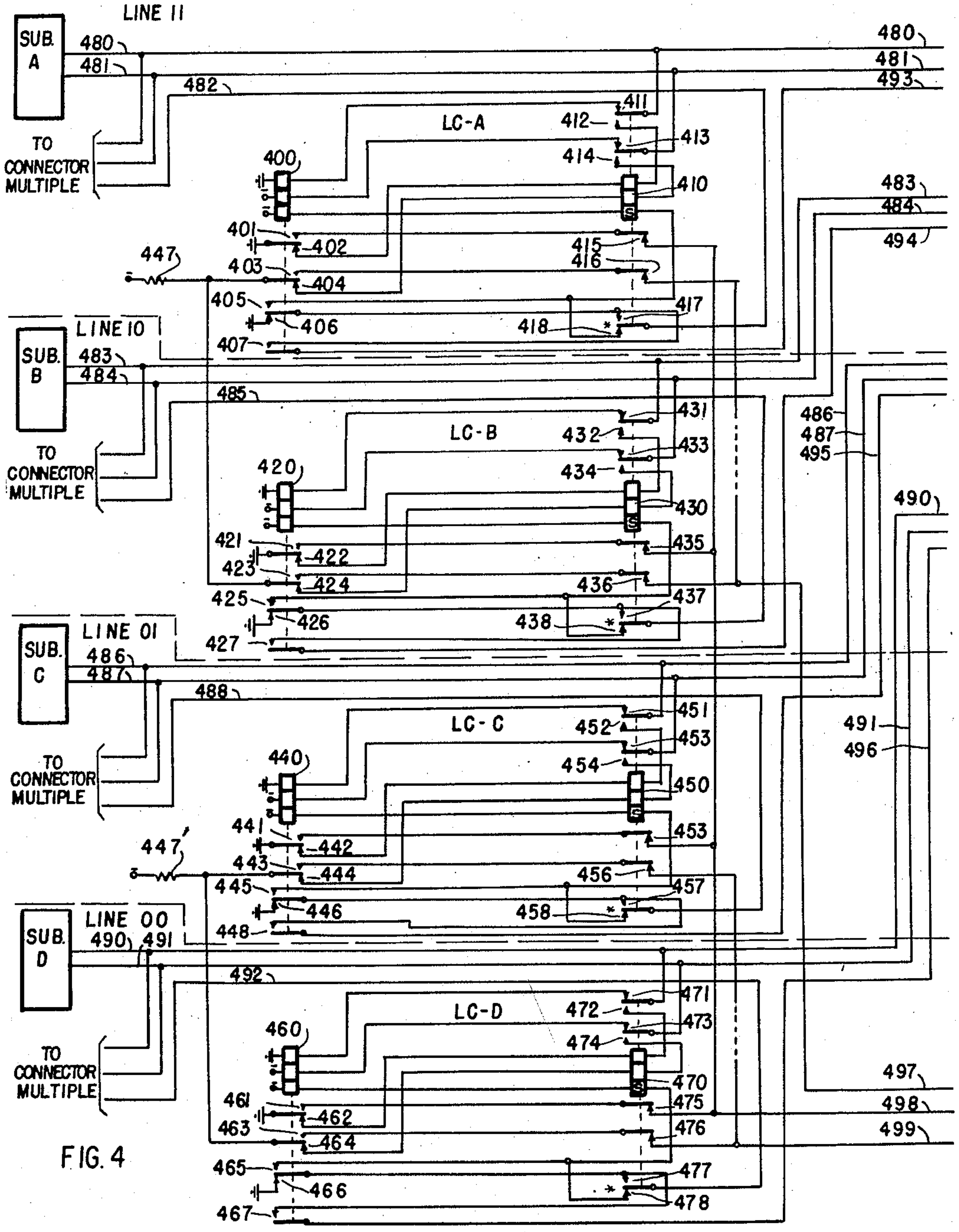
Figure 5:
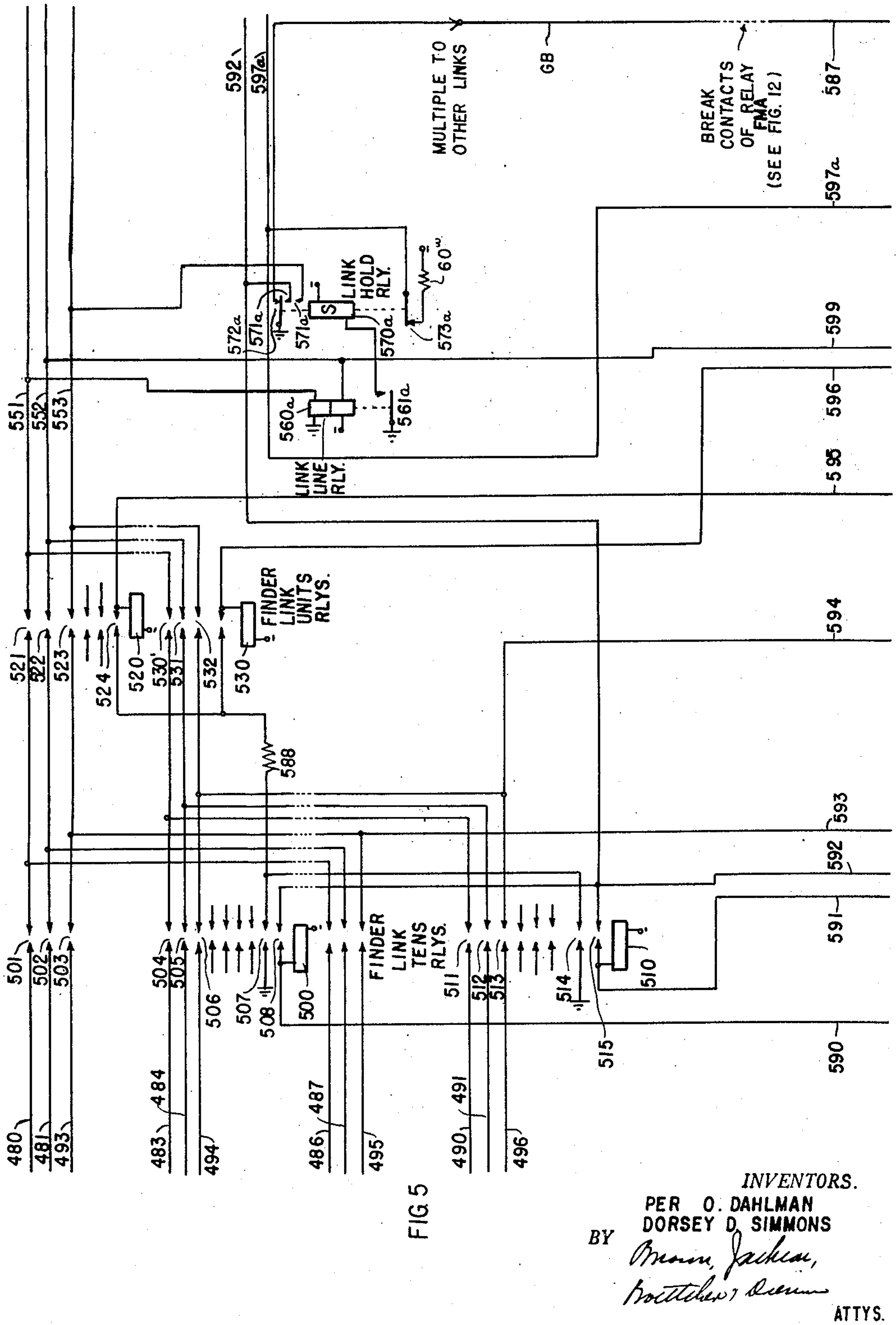
Figure 6:
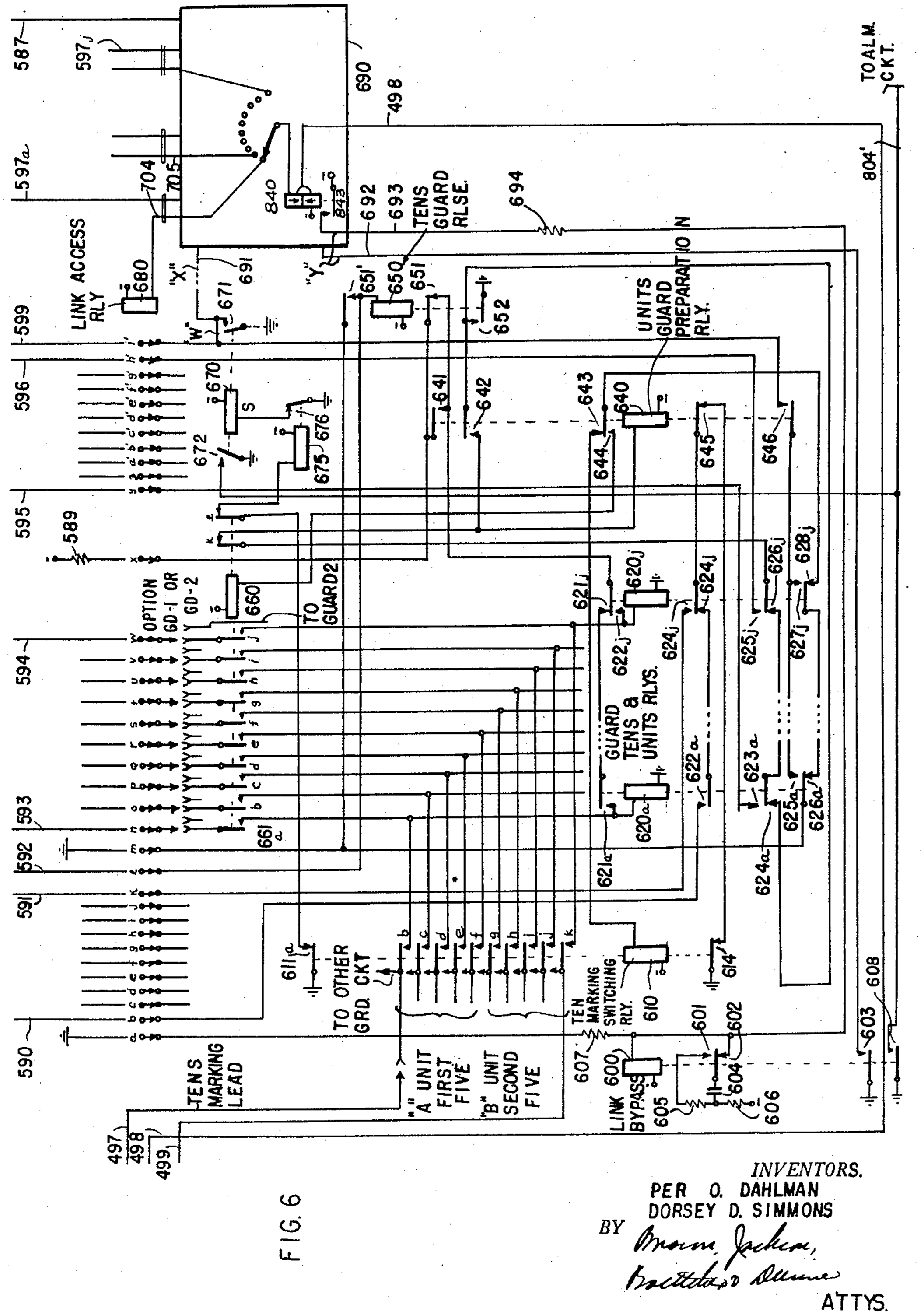
Figure 11:
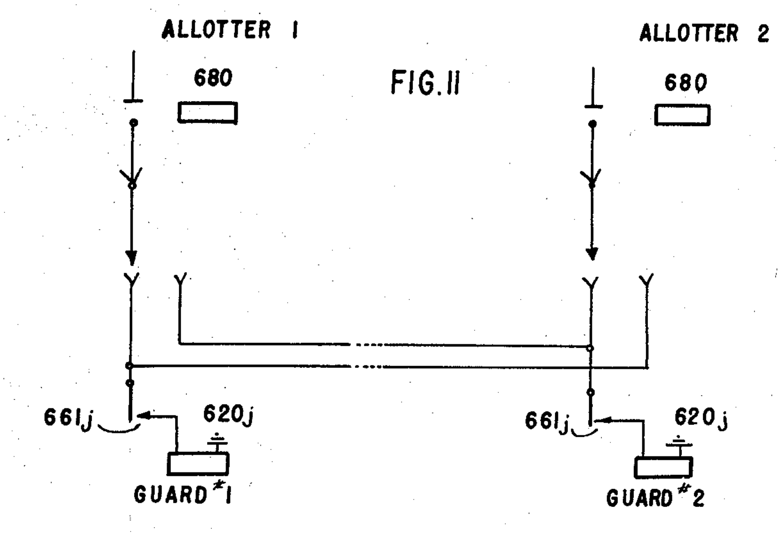
Figure 12:
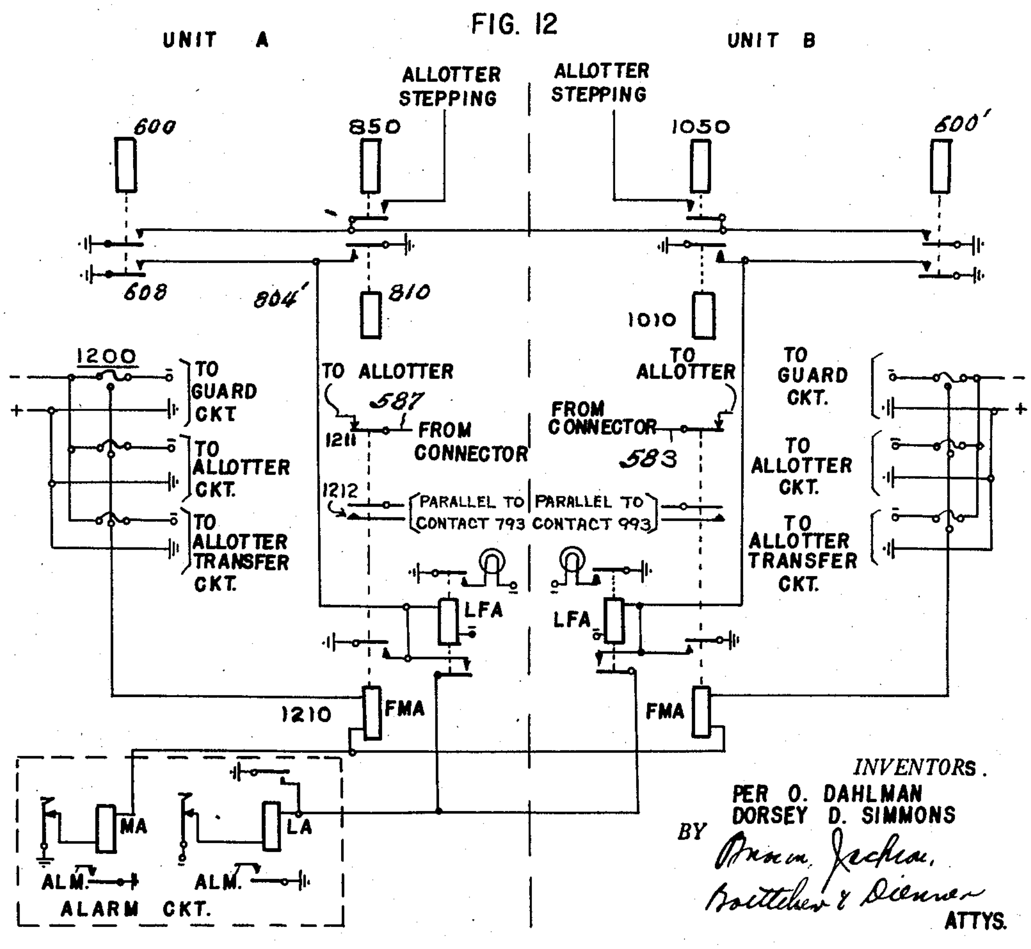

Figure 3*a* illustrates the alternative manners of operation of the equipment which may be provided with the setting of selective switches in the allotter to various positions;

Figures 4–6 when laid in side by side arrangement illustrate the novel line circuit and guard arrangement as utilized with associated link equipment, the allotter equipment being shown therein in block form;

Figures 7–10 illustrate two allotters as interconnected to provide increased system capacity;

Figure 11 illustrates schematically the manner in which a single guard circuit may be connected for use with a system having two allotter units;

Figure 12 illustrates an integrated alarm signalling and transfer circuit.

*System layout*

There is now presented for purposes of simplifying the introduction to the subject matter, a brief description of the component parts of each of the novel circuits of the system, and a brief disclosure of the manner of operation of the parts and the switch in use. A detailed description of the system and the manner in which it operates to extend a calling line to a called line is set forth thereafter.

Figure 1:
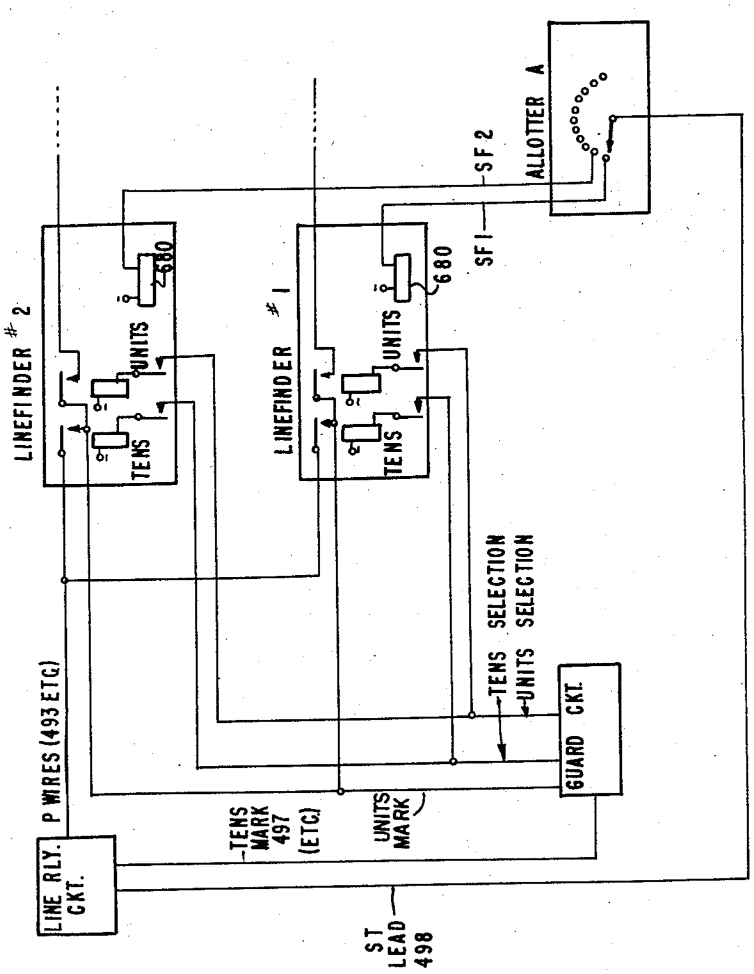
Figure 1 illustrates in block form the basic arrangement for effecting extension of a calling subscriber line to call extending equipment.

The system, as shown in Figure 1, basically comprises a plurality of subscriber lines, each of which has a line circuit individual thereto, a plurality of line-finder-connector links for extending calling lines to called lines, an allotter circuit for preselecting the links for use by calling ones of the subscribers, and a guard circuit for effecting connection of each calling line to the preselected link. Consideration is given first to the line circuit arrangement.

*Line circuit*

Each subscriber, such as subscriber A, has a line circuit, such as LC–A (Figure 4) associated therewith for the purpose of seizing a preselected idle link responsive to removal of the receiver from the handset by the calling subscriber. For purposes of simplicity only a limited number of line circuits are illustrated, the manner of connection of the circuits being apparent from the disclosure and known practices in the art.

Each such line circuit has a three winding line relay, such as relay 400, and a three winding cut-off and lock-out relay, such as relay 410 associated therewith. Novel circuitry means interconnect these two relays to effect the three functions of a line circuit, i.e., landing, cut-off and lock-out, in the same expeditious and reliable manner as is accomplished by conventional circuits having three or more relays.

*Call from line*

Briefly, with the extension of a loop by the calling subscriber such as B to his associated line circuit, such as LC–B, the line relay 420 identifies the calling line by marking its associated tens mark lead 497 to the guard circuit (Figure 6), and simultaneously marking its P-wire for identification purposes. The line relay also sends a seizing signal over a common start lead 498 to a link which has been preselected by the allotter equipment.

The seized link and guard circuit operate to locate the circuits marked by the line circuit, and thereafter extend the calling line to the link connector switch. As the connector switch is seized, ground is returned to the line circuit over the P-wire 494 to effect the operation of the cut-off and lock-out relay 430 in series with the line relay 420 thereat.

Cut-off and lock-out relay 430 operates and establishes an alternate holding circuit for itself in series with the line relay; connects ground to the connector P-wire to notify incoming calls of the busy condition of the line, and removes the line circuit marking to the guard circuit.

When the calling party restores, the line loop is interrupted to restore the link and thereby effect removal of ground from the P-wire. Line relay 420 releases more quickly than cut-off relay 430, and a lock-out test is quickly made. That is, in the event that a loop or short exists across the line during such time as the cut-off and lock-out relay 430 is maintained operated and the line relay 420 is restored, cut-off and lock-out relay 430 locks over the line loop circuit and places ground on the P-wire 485 to make the line busy to incoming calls.

As the loop or short is subsequently removed, the cut-off and lock-out relay 430 restores as above to return the line circuit to its normal condition.

*Call to a line*

With the extension of a call to a line B, the connector switch will extend ground over the P-wire 485 to energize the line relay 420 and the cut-off and lock-out relay 430 in series. The line relay 420 operates more quickly than the cut-off and lock-out relay 430, and will accordingly effect a momentary grounding of the units and tens mark circuits awaiting operation of the cut-off and lock-out relay 430. However, such momentary energization is without effect at this time.

As the cut-off and lock-out relay 430 then operates, certain operating circuits which extend through the coils of the line relay and the cut-off and lock-out relay are transferred to open circuit to prevent shunting of the ringing current while the line is being rung; the temporary units and tens marking circuits are interrupted, and a holding circuit is completed for line relay 420 and the cut-off and lock-out relay 430, which are held for the duration of the call. As the connector removes ground from the P-wire 485, the two relays 420 and 430 release as aforedescribed.

It is apparent from the foregoing that the two-relay line circuits of the disclosure are operative to provide the novel functional operations in an expeditious and reliable manner.

*Line finder guard arrangement*

The line finder guard arrangement and representative portions of one of the links are illustrated in Figures 5 and 6, the illustrated link comprising a line finder and a connector switch wired together "tail to tail," it being understood that the line finder and connector carry a full multiple of one hundred subscriber lines in a conventional manner, and that the arrangement could also comprise a finder-selector arrangement in like manner. The subscriber lines are connected respectively in groups of ten to the outside contacts of the "tens" relays 500, 510, and the tens relays are connected in a conventional manner to the multiple contacts of the "units" relays 520—530. With the seizure of a link by a calling subscriber, the associated line finder effects operation of the tens relay and units relay associated with the calling subscriber line, and extends same to the connector control relays. The operation of the conventional line-finder-connector link is well known, and further description is not believed to be necessary, reference being made to the teachings of Miller in the text entitled "Automatic Switching and Auxiliary Equipment."

A guard circuit (Figure 6) is connected between the line circuits individual to the subscriber lines and the line-finder connector links, the purpose thereof being to guard the line finders against simultaneous seizure by two or more calls originating at the same instant. The novel guard circuit arrangement of the present illustration comprises a minimum amount of equipment which is operative in a fraction of a second, so that no delay in the guarding operation is apparent to the subscribers of the exchange. The disclosed guard arrangement is particularly novel in that it utilizes a single group of ten guard relays to accomplish both the tens and units guarding functions, which operation in previous arrangements required twenty or more relay units.

Briefly, as illustrated in Figure 6, the line finder guard arrangement comprises a link access relay 680, a single group of guard relays 620*a*–620*j*, a units marking switching relay 660, a tens marking switching relay 610, a tens guard release relay 650, certain ones of the link bypass relays 670—675 and 600 (depending on the selected wire connectors, W, X or Y), and units guard preparation relay 640.

Each group of ten line circuits are connected to the guard circuit by a tens marking lead such as lead 497 for line circuits LCA, LCB, to provide identification to the guard of the calling tens group. The circuits are arranged so that the guard relay nearest ground will lock-up alone in the event of the simultaneous initiation of a call by several subscribers.

The guard circuit is multipled to each of the links by a series of units mark conductors such as 593, 594, etc., the marking conductors being specifically connected to the tens relays contacts so that with operation of a tens relay, the P-wire conductors of the ten lines in such group are extended to the guard circuit for examiantion thereby.

Briefly, as the link access relay 680 of the allotted one of the links is operated responsive to seizure over start conductor 498 by the line circuit of the calling party, it effects the operation of the tens marking switching relay 610 which, in turn, extends the tens marking leads such as 497 to the guard relays 620*a*–620*j*, the relay of this group which is associated with the marked tens number of the calling line being thereupon operated. Assuming subscriber B is the calling party, the illustrated tens marking lead 497 will be marked and the first guard tens relay 620*a* will operate.

As the guard tens relay 620*a* operates, the operating circuit for the tens marking relay 610 is interrupted to allow the guards relay nearest to ground to lock up releasing any other guards relays which may have operated and to disconnect the tens mark leads in preparation for units marking.

As the tens marking switching relay 610 restores, the line finder tens relay associated with the calling subscriber line (tens relay 500 in the present example) will operate, and the P-wires of the lines in the first tens group are connected to the guard circuit.

As the line finder relay 500 operates, the tens identification on the guard circuit is cleared, and the circuit is prepared for selection of the units identification conductor which now occurs. Assuming the incoming call is from subscriber B (line 10) the tenth guard relay 620*j* will operate, and the tenth unit relay 530 (F0) will be energized. As the line finder units relay 530 operates, it extends the calling line loop to the connector switch in a well known manner. The connection now extends from the substation of the calling subscriber B over conductor 483, 484, contacts 504, 505, 506 of the operated tens relay 500, contacts 530′, 531 and 532 of the operated units relay 530, and over conductors 551, 552 and 553 to the control relays of the associated connector switch in the link.

The operated one of the guard tens and units relays (in the present example 620*j*) is also effective to prepull the line relay 560*a* in the link connector switch.

Connector link line relays 560*a* and 570*a* operate in sequence to place ground on the connector P-wire 553, and to apply holding ground to the operated one of the line finder tens relay. The P-wire signal is transmitted back to the cut-off and lock-out relay 430 associated with the calling party line circuit to notify same that the control switch has been seized and then cause same to notify other subscribers that the line circuit is busy. The operation of the cut-off relay removes its ground from the start lead; also its signal from the tens marking conductor.

The connector signals the allotter to shift the start conductor 498 to the next available link, and in doing so releases link access relay 680 which releases the guard circuit, the operation of the allotter being described more fully hereinafter.

In the event of a failure of a relay in the guard circuit which causes the guard circuit to be held for more than a predetermined length of time, timing means operate to effect operation of the allotter in search of an idle link, as will be more fully described hereinafter.

*Allotter equipment*

The allotter, as schematically shown in Figure 6, is operative to preselect an idle link for use by a subscriber, each further allotment being made immediately following seizure by a calling subscriber of a link which was previously selected. In the event that two calls are initiated simultaneously, a second call is held for a period which is normally undetected by the calling subscriber, and after a very short delay an idle link is allotted thereto.

According to the present invention, each allotter is adapted to serve a unit comprised of fifty lines and ten links. Moreover, the unit is so designed that two of said units can be connected with plug ended cables to provide one hundred line, twenty link operation. With reference to Figures 2 and 3 and 7–10 inclusive, there is shown thereat the manner in which two single allotters are interconnected to provide a hundred line-twenty link arrangement.

Each of the two allotters shown (Figures 7, 8, and 9, 10 respectively), are substantially mirror images of each other, as will be observed from comparison of the arrangements in the several figures when laid side by side. Accordingly, a description of one of the allotters will basically serve as a description of the second allotter.

The components of each allotter are basically as follows:

Relays:

- 570*a*–570*j*, 570*k*–570*t*—Link hold relays of the various links associated with the first and second allotters
- 750*a*–750*j*, 950*a*–950*j*—Stepping chains for the first and second allotters
- 740, 940—Stop relays for stepping chain of first and second allotter
- 790, 990—Allotter transfer relay and end of chain release relay. When operative as a single unit (50 lines, 10 links), relay 790 operates momentarily when the last link in the allotter is seized—if any link is idle, i.e., relay 850 (or 1050), is held subsequently 750*j* (or 950*j*) is restored to effect chain recycling. When connected with a second allotter, relay 790 (or 990) operates momentarily when the last link in allotter #2 is seized and any link in allotter #2 is idle.
- 850, 1050—Allotter access relay; also has transfer functions. In single unit operation, relay 850 (1050) operates when any link is idle. In dual unit operation, relay 850 (1050) operates when any link in its own allotter #1 is idle, if the corresponding relay in the second allotter circuit has not been operated.
- 840, 830, 810 and 800, 1040, 1030, 1010 and 1000—Allotter check and transfer relays
- 820, 1020—Allotter over-load indication relays As mentioned above, the equipment in the second allotter is identical to that in the first allotter, and is identified in like manner, the 900 and 1000 designators in the second allotter corresponding to the members labelled 700 and 800 in the first allotter.

The allotter is connected to each of its associated links by marking conductor 597*a*—597*j*, the links being operative to inform the allotter over these conductors of their operated and nonoperated conditions. The allotter is connected to the link access relay, such as 680 of each of the links by conductors such as 704, 705, etc., and the orderly preselection of each link by the allotter is made over these conductors.

A common start lead 498 connects the allotter to the fifty lines of the exchange, the start lead as schematically shown in Figure 6 being normally connected to an idle preselected link by the allotter unit.

Alarm circuit conductors 804′ connect the allotter to visual and/or audio signalling means for the attendants. All trunks busy indication lead 807 extends to the subscriber lines, and the allotter signals same over such conductor whenever such condition occurs. The allotter is also connected over conductor 896 to an overflow meter circuit, and is operative to inform same of an all trunks busy condition.

The arrangements for interconnecting two allotters to provide added traffic capacity will be set forth in greater detail hereinafter.

*Allotter single unit operation*

A brief consideration will now be given to the functions of the allotter in its use with a 50 line-10 link arrangement. Key 880 is operated in such case to the single unit position. As the equipment is energized (assuming no calls have been made), the "G" relay 570*a* and a corresponding relay in each of the links will be in the restored condition, and 60 ohm battery will be extended over each of the conductors 597*a–j* to indicate the idle condition of the links to the allotter. The allotter access relay 850 is operated to indicate that one or more links associated with the allotter is available. The first stepping relay operates and connects the first marking conductor to the stop relay 740. Upon finding the first link idle, the stop relay operates to prevent further operation of the chain, and the first relay 750*a* extends the start lead 498 to the link access relay of the first link awaiting receipt of the first call.

As a calling subscriber seizes link 1 via start lead 498, the "G" relay 570*a* for the first link is operated to cause release of stop relay 740, which in turn steps the chain in search for an idle link. If the second link is idle, 60 ohm battery on its marking conductor will operate the stop relay 740 through make contacts of the operated second chain relay 750*b*, and the operation of the stop relay 740 stops the search and extends the start lead to the second link. If however the second link is busy, the stop relay 740 does not operate and the chain continues to step until an idle link is found.

As the equipment is operated to the point where the tenth link is seized, and the "G" relay 570*j* of the tenth link operates to mark its lead as busy, stop relay 740 restores, and a circuit is prepared for the end-of-chain relay 790. At this time, the operation of relay 790 depends upon the existence of certain conditions. That is, if there is an idle link accessible, the allotter access relay 850 will be in the operated condition, and end-of-chain relay 790 will operate to effect the restoration of the tenth stepping relay 750*j* which in turn restores the end-of-chain relay 790 to cause the chain to step along in search of the idle link.

In the event that there is no other link idle as the tenth link is seized, the stop relay 740 and allotter access relay 850 are restored, and accordingly the end-of-chain relay 790 will not be operated. As a link subsequently becomes idle, access relay 850 operates to cause the chain to recycle in search of the idle link.

It is noted that the operation of the chain and stop relays is dependent upon a differential in their times of operation, the stop relay operating in about fifteen milliseconds, and the allotter relays operating in about thirty milliseconds.

In that key 880 is operated to the single unit position, the allotter access relay is entirely dependent via lead 587 upon the connector "G" relays 570*a*—570*j* for its operation. Thus, if all links are seized, each of the relays 570*a*—570*j* will be in the operation position, and relay 850 will be restored. Shortly thereafter, slow-to-release relay 820 will restore to start the tone circuit, to prepare for all links busy tone, and to prepare for overload metering.

With receipt of ground over the start lead 806 as a result of the next attempted call, the operation of an overload meter will be effected and the all trunks busy signal is connected over conductor 894 to the line circuits in a conventional manner.

Provision is also made for a line finder alarm which is operative in the event that allotter relay 850 indicates that there is an idle link available, and the equipment is inoperative to locate such link.

*Two unit operation*

Figure 2:
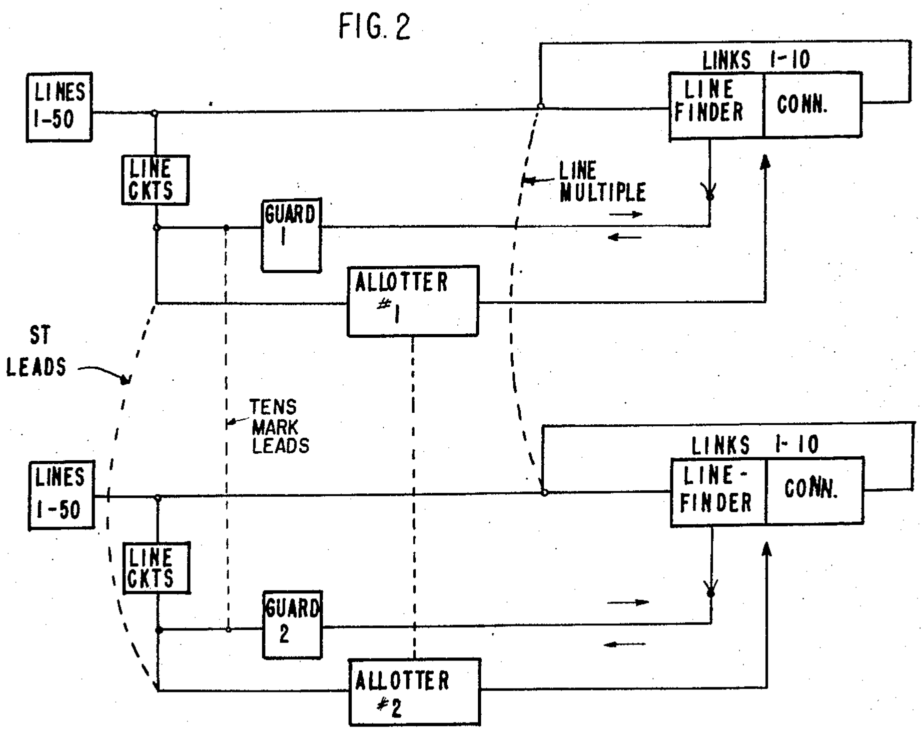
Figure 2 illustrates in schematic block form the manner in which two ten link-fifty line arrangements may be multipled together.
Figure 7:
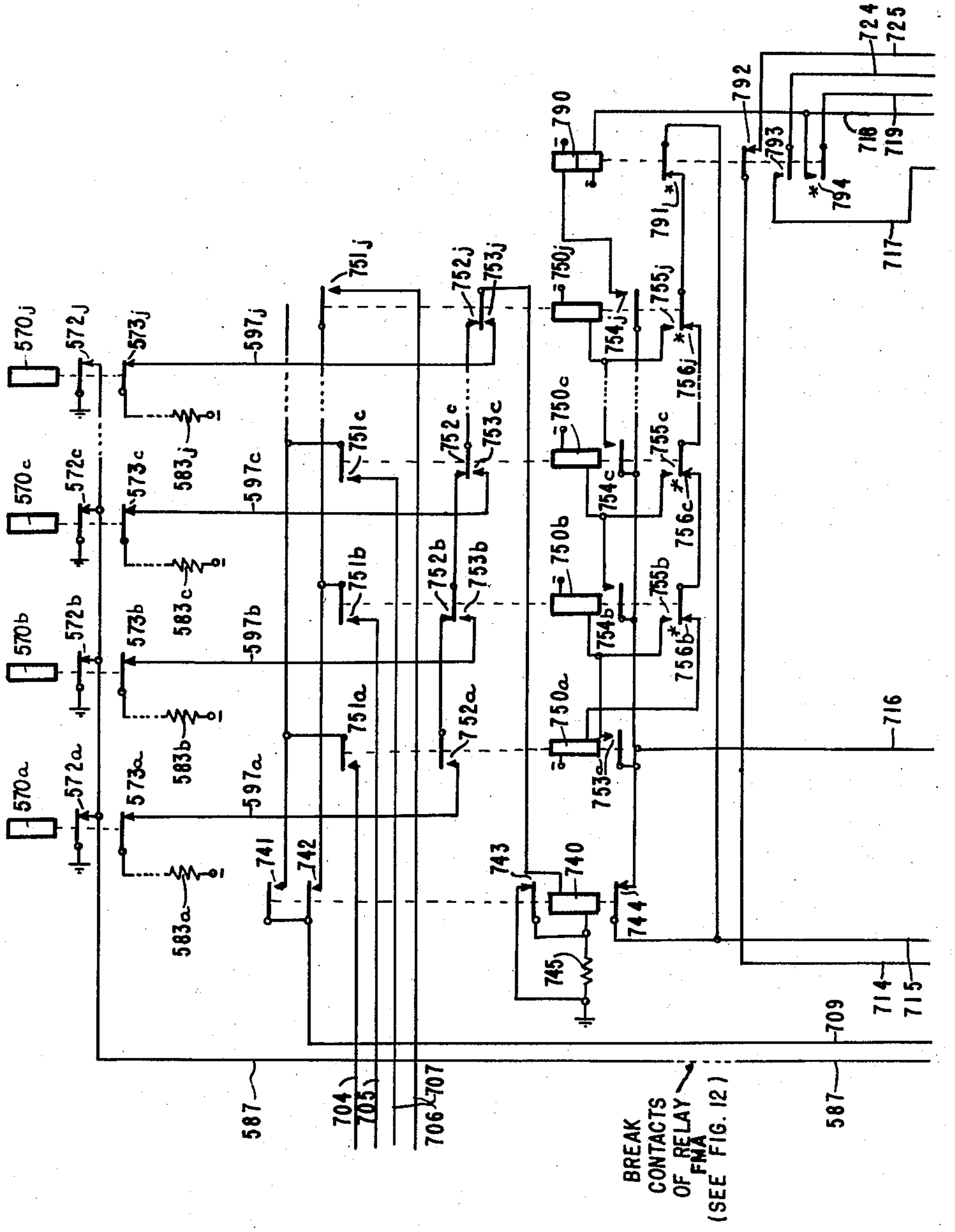
Figure 8:
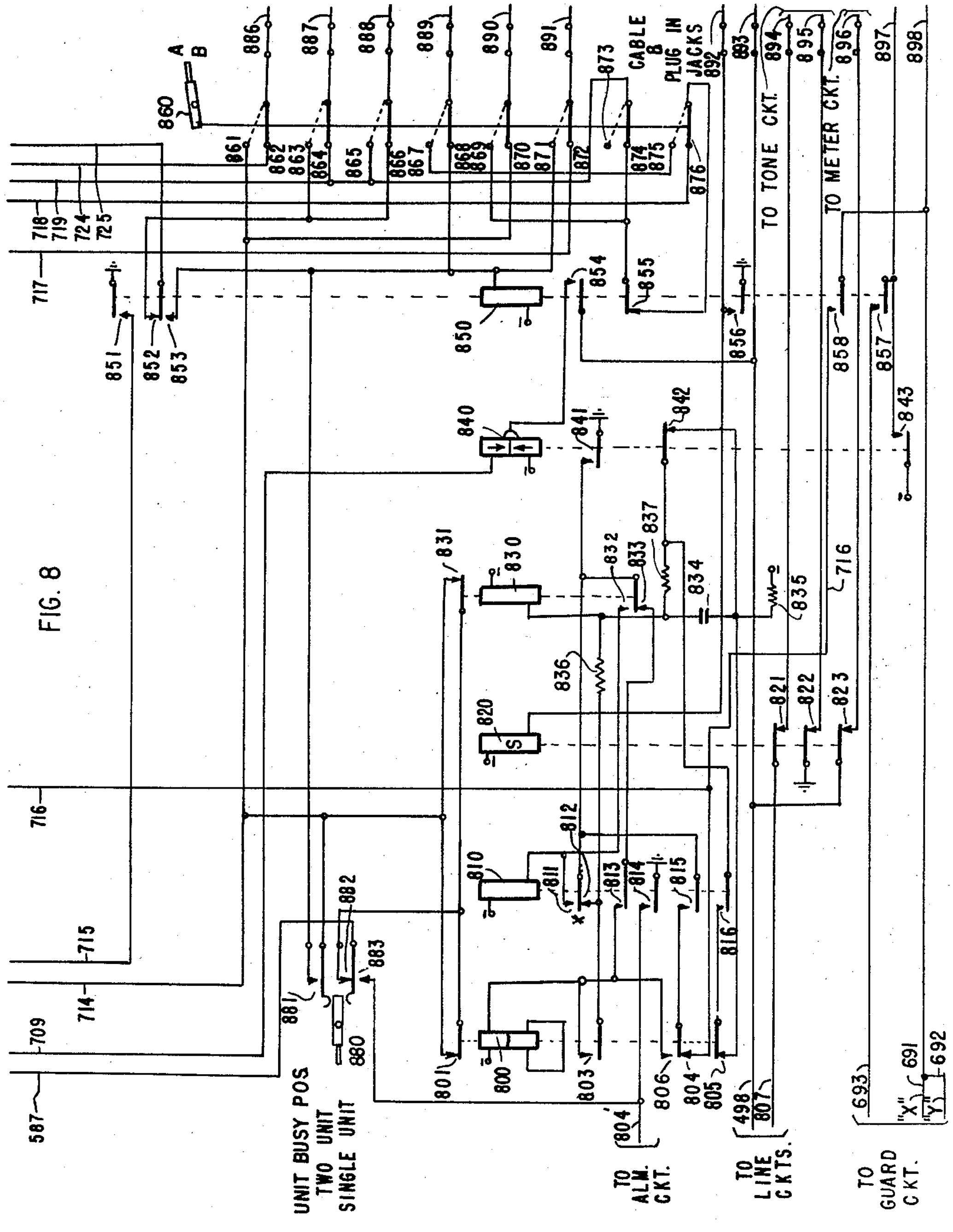
Figure 9:
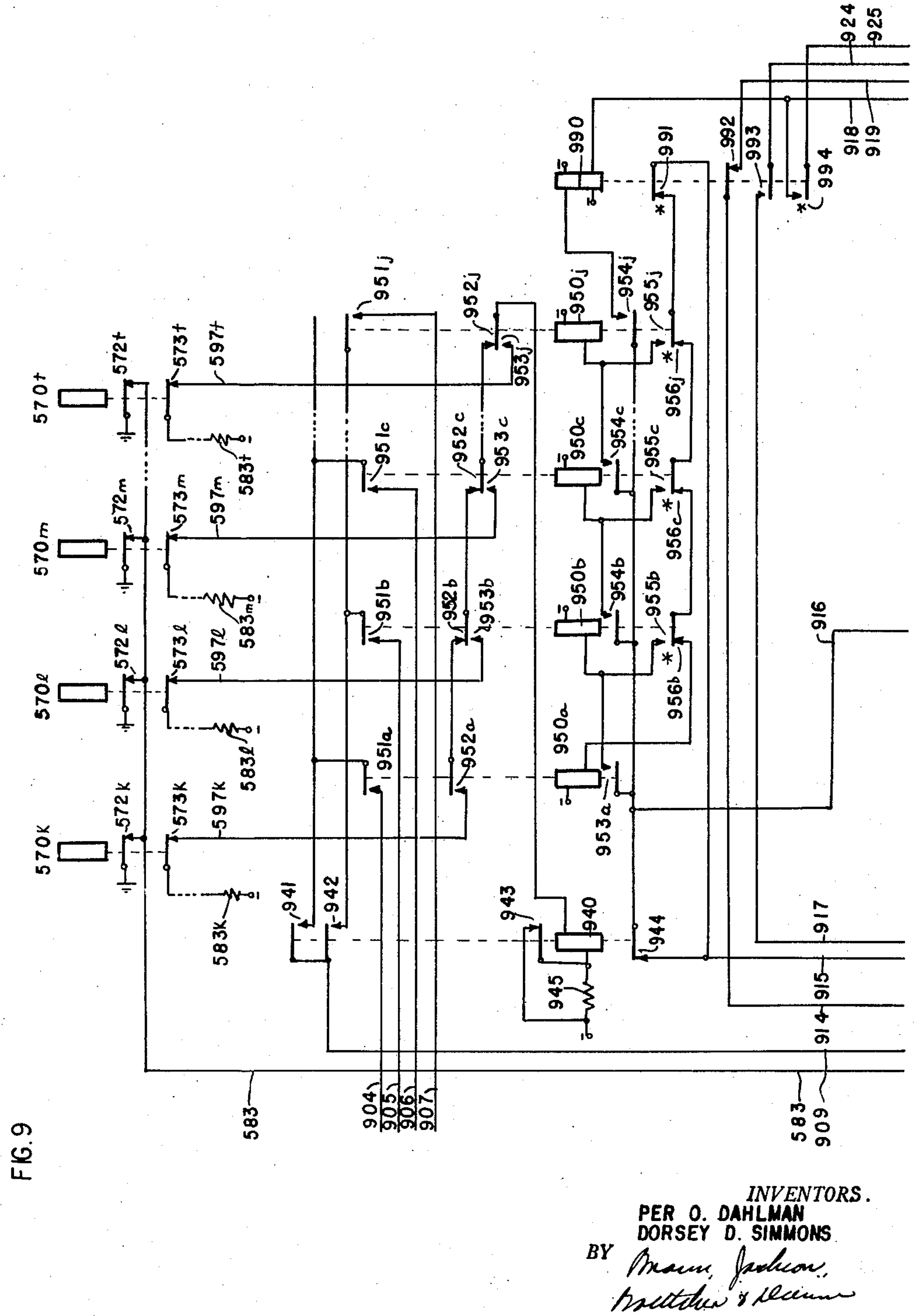
Figure 10:
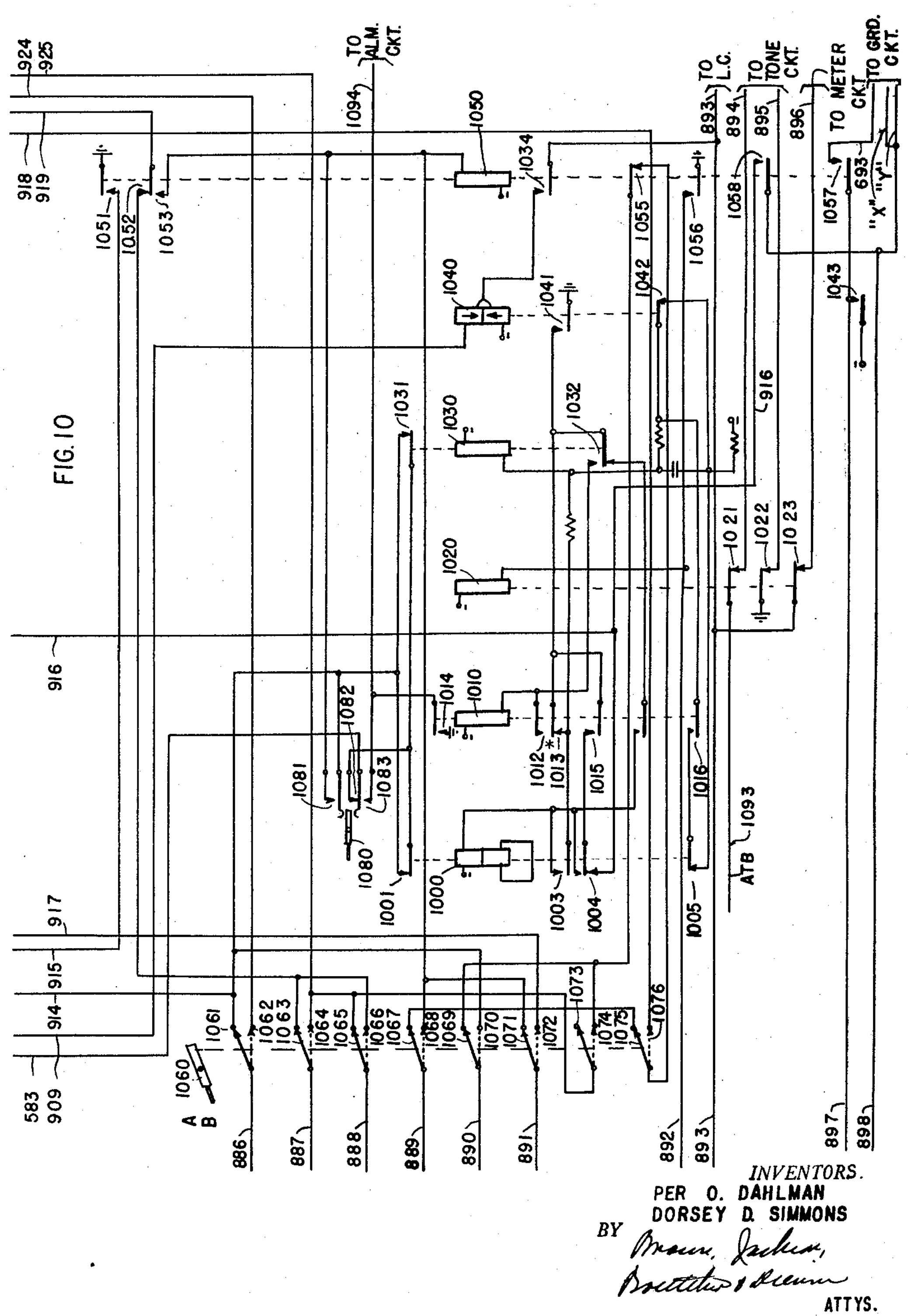

In the event that the ten link-fifty line arrangement is to be utilized with a second unit of similar size to provide a twenty link-one hundred line arrangement, the two units shown respectively in Figures 7, 8, 9 and 10 are interconnected by plug-in switching means such as shown in Figures 8 and 10. A schematic representation of the interconnection is shown in Figures 2 and 3. As there shown, interconnection of the two systems basically consists of connecting multiple leads between the line circuit, allotter and link equipment whereby two individual ten link-fifty line arrangements are transferred into one twenty link-one hundred line arrangement.

Switching means included in the arrangement permit adjustment of the operating sequence of the system. That is, with reference to Figures 8 and 10, and specifically to switches 860 and 1060, it is noted that with the switch 860 moved to the A position and the switch 1060 moved to the B position, the sequence of operations will start with unit A. With the movement of the switch keys 860 and 1060 to the positions opposite to that shown (i.e., to position B and A respectively), the operation sequence will start with the first link associated with allotter B. The sequence of operations resulting with operation of the switch keys to these alternative positions is shown in Figure 3*a*.

In a two unit connection the operations of the allotter access relays 850 (1050) and the allotter transfer relays 790 (990) are determined by the existing operating conditions in both units. That is, when the tenth link of the first unit is seized as a result of the operation of the tenth stepping relay **750*j***, four possibilities arise:

(*a*) There may be no links idle in either allotter. In such event, allotter access relay 850 restores to in turn restore stepping relay **750*j*** and neither allotter operates, as there are no idle links to be found. As a link becomes idle, the allotter having such link initiates a search therefor.

(*b*) There may be links idle in the first allotter only. Allotter access relay 850 is maintained operated, and with the release of the stop relay 740, transfer relay 790 operates to restore stepping relay **750*j*, which in turn restores transfer relay 790**. The chain in the first allotter steps in search of the idle link.

(*c*) There may be links idle in both allotters. Transfer relay 790 in such event effects operation of the allotter access relay 1050 in the second allotter unit, which, in turn, restores allotter access relay 850 and transfer relay 790 in the first allotter unit. The second unit is thus given priority and a searching for the idle links therein is effected, even though idle links are also to be found in the first allotter unit.

(*d*) There may be links idle in the second unit only. Allotter access relay 850 in the first allotter will be restored as a result thereof, and the second allotter is rendered effective. In such event, the transfer relay 790 is maintained operated while transfer is being effected so that even though a link becomes idle in the first unit to thereby effect reoperation of the allotter access relay 850, transfer relay 790 will be operated, and the second allotter will be effective.

When the twentieth link is seized (the tenth link of the second unit), there are four conditions of operation which may exist and the operation of the allotters are effected in accordance with the particular condition which exists:

(*a*) There are no links available in either allotter unit. Accordingly neither allotter should effect a searching operation. In such event, allotter access relay 1050 restores to in turn restore stepping relay **950*j*** and neither allotter operates, as there are no idle links to be found. As a link becomes idle, the allotter having such link initiates a search therefor.

(*b*) There may be links available in the second unit only. Allotter access relay 1050 in the second allotter unit is maintained operated and with the release of stop relay 940, transfer relay 990 operates to restore allotter access relay 1050 and the tenth stepping relay **950*j*. As allotter access relay 1050 restores, it effects restoration of the transfer relay 990 in the second allotter which operates the transfer relay 790 in the first allotter unit, which effects reoperation of the allotter access relay 1050 in the second unit. Allotter access relay 1050 operates, and locks up to cause its chain to search for the idle link therein. Relay 1050 releases relay 790**.

(*c*) There may be links available in both allotters. Operation in such event is shifted to the first allotter. Transfer relay 990 operates and locks to relay 850 to restore allotter access relay 1050, and the tenth stepping relay **950*j* of the second unit. With the release of the allotter access relay 1050 in the second allotter unit, the allotter access relay 850 in the first unit is operated, and the stepping chain in the first unit is operated to find the idle link therein. The operation of 850 releases relay 990**.

(*d*) There may be links availavle in the first allotter unit alone. Selection should, in such event, be transferred to the first allotter. Allotter access relay 1050 is released as the stepping chain advances to the tenth relay **950*j* of the second unit operating link relay 580*t*. With release of relay 1050, relay 850** in the first unit operates. Searching for an idle link in the first allotter unit is thus initiated.

*All trunks busy protection*

Indication of an all trunks busy condition is provided to the subscribers in the dual arrangement as in the single unit operation. However, in the accomplishment of such indication, the allotter access relays 850 and 1050 for both units must be restored to properly indicate that all of the links are busy. As a result of the restoration thereof, the tone circuit is operated, and busy tone is supplied to the subscribers. Further, as each call is attempted thereafter by the lines associated with either unit, a circuit is extended to the overload meter over conductor 896 to provide a record thereof. Lines associated with the first allotter unit receive all trunks busy signal over conductor 807, whereas the lines associated with the second unit receive such indication over conductor 1093.

An alarm arrangement is provided to indicate the improper operation of the equipment with failure of the equipment to find a link when the system indicates a link is available therein. The fault relay 810 (1010) in the allotter operates to effect restoration of the associate allotter access relay 850 (1050), and transfer of the operations to the other allotter unit is effected.

*Establishment of a call by subscriber B (Line 10) to a subscriber C (line 01)*

The operation of the system will be more fully apparent with consideration of the conditions of operation effected in the establishment of a call by a subscriber, such as subscriber B at line 10 to a second subscriber, such as subscriber C at line 01. The call is initiated in the conventional manner with removal of the receiver of the telephone instrument from its substation by the calling subscriber at the substation B, whereby a bridge path at the substation B is completed between the line conductors 483 and 484 of the subscriber line 10.

With the completion of the bridge path in this manner, an energizing circuit is completed for the line relay 420 associated therewith, such circuit extending from negative battery over the middle winding of relay 420, contacts 433, conductor 484 and the bridge at subscriber substation B to conductor 483, contacts 431 and the upper winding of line relay 420 to ground.

Line relay 420 operates, and at its contacts 421 connects ground to the start lead 498 for the purpose of seizing an idle link as preselected by the allotter; at its contacts 423 connects negative battery over resistance 447, contacts 423 and 436 to the tens mark lead 497 for the purpose of identifying the tens group to which the calling substation is assigned; at its contacts 422 and 424 interrupts a set of circuit connection to the coils of the cut-off and lock-out relay 430; at its contacts 425 prepares a holding circuit for the cut-off and lock-out relay 430; at its contacts 426 interrupts the "lock-out" ground source; and at its contacts 425 and 427 connects negative battery to the P-wire conductor 494 for the line circuit LC–B, which as shown hereinafter, serves to identify the units designation of the line circuit.

As a result of the link preselection which has been effected by the allotter circuit 690, the application of ground to the common start conductor 498 by the line circuit effects operation of the link access relay 680 which is associated with the preselected idle link (assumed in this case to be link 1 associated with the first allotter unit), the circuit extending from negative battery over the winding of relay 680, conductor 704 (Figure 6) to the allotter circuit (see Figure 7), contacts 751*a*, contact 741, the upper winding of relay 840, contacts 854, conductor 498, contacts 435 and 421 to ground.

Link access relay 680 associated with the first link operates, and at its contacts 680*a–z*, *a'–i'*, extends circuit connections from the line finder of the seized link to the guard circuit equipment.

Inasmuch as the calling subscriber B is connected to line 10, it is apparent that the finder "tens" relay 500 (F10) and the finder units relay 530 (F0) will be operated to extend the line of the calling subscriber through to the switching equipment.

Such operation is initiated by the guard circuit responsive to the connection of the finder equipment thereto by access relay 680, and specifically responsive to completion of an operating circuit for the tens marking switching relay 610 in the guard circuit with the closing of contacts 680*m*, the operating circuit extending from negative battery over the winding of relay 610, contacts 643, 628*j*, 626*a* and 680*m* to ground.

As will be brought out more fully hereinafter, the circuit is equipped with one of several illustrated timing systems, each of which is operative after the elapse of a predetermined time period and the failure of the equipment to connect the calling line to the preselected link in that time, to transmit a signal to the allotter equipment to indicate thereto that faulty operation is being experienced. The alternative arrangements are provided by connecting the alternative conductors "W," "X" and "Y" in the system as will be more thoroughly described hereinafter in connection with the consideration of the allotter equipment.

Tens marking switching relay 610 operates, and at its contacts 611*a* interrupts the holding circuit for one of the timing system relays 675 (if "X" or "W" wiring is being used), and at its contacts 611*b*–611*k* extends the tens mark leads such as 497 for each of the tens groups to the guard relays for examination thereby.

Digressing briefly, it is noted that the present system is comprised of a ten link-fifty line arrangement. Accordingly, there are only five "tens" groups and only the first five contacts (611*b*–611*f*) will be required. In a one hundred system, the extra five contacts would be necessary. As shown in Figure 6, the five marking leads associated with one fifty line system are connected to the first five contacts, and the five marking leads associated with another fifty line system may be connected by a jack and plug arrangement to the second set of contacts (611*g*–611*k*), whereby each guard circuit will serve all lines. In the second unit, the links connect to the guard circuit, with connections identical to the connection to the links in the first unit, i.e., contacts 680*a–z*, *a'–i'*. Furthermore, the link equipment associated with the first allotter (illustrated) may be connected to the guard circuit associated with the second allotter (not illustrated) or vice versa, whereby service will not be interrupted should one of the guard circuits develop trouble, and only one guard circuit must serve all twenty links. The alternative connections are identified in Figure 6, and a more clear showing is set forth in Figure 11, wherein exemplary alternative connections for the same relay (620*j*) in the two guard circuits are set forth.

It is assumed initially (for purposes of a less complicated disclosure), that the guard system serves only fifty lines, and that the five tens leads are connected to contacts 611*b*–611*f* of relay 610. As the tens marking conductors, such as 497, are forwarded to the guard relays 620*a*–620*j* as a result of the closure of contacts 611*b*–611*k* by the tens marking switching relay 610, an operating circuit is completed for the particular relay which is associated with the tens group of the calling subscriber line.

Assuming subscriber B (line 10 of the first "tens" group) as the calling party, the first tens guard relay 620 is operated, the operating circuit extending from positive battery over the winding of relay 620*a*, contacts 611*b*, tens mark conductor 497, contacts 436 and 423 and resistance 447 to negative battery.

Guard relay 620*a* operates, and at its contacts 621*a* completes a locking circuit for itself which extends over the corresponding break contacts 621*b* (not shown)–621*j* of each of the guard relays 620*a*–620*j*, contacts 651 and 680*x*, and resistance 589 (which is in the order of 250 ohms) to negative battery.

The first guard tens relay 620*a* is also effective at its contacts 626*a* to interrupt the holding circuit for the tens marking switching relay 610 to effect the restoration thereof; and at its contacts 622*a* prepares an operating circuit for the tens relay 500 (F10) in the line finder of the seized link, this being the assigned tens group for the calling subscriber (line 10).

As the tens marking switching relay restores, it completes an operating circuit for the proper finder tens relay 500 (F10), which circuit extends from negative battery over the winding of relay 500, conductor 590, contacts 680*b*, contacts 622*a*, 624*b*–624*j* of the guard relays, and contacts 645 and 614 to ground.

The finder tens relay 500 (F10) associated with the first tens group operates, and at its contacts 508 extends its operating ground over conductor 592 and contacts 680*l* to the tens guard relay 650, which operates, and at its contacts 651' locks up to ground over contacts 680*m*; at its contacts 651 interrupts the holding circuit for the operated one of the guard relays (the first relay 620*a* in this call), and at its contacts 652 prepares an operating circuit for the units guard preparation relay 640.

The operated one of the guard relays (in this call 620*a*), restores, and at its contacts 622*a* interrupts the energizing circuit for the tens finder relay 500 (F10), which holds over the locking circuit which extends over conductor 592, contacts 680*l*, 651' and 680*m* to ground; and at its contacts 624*a*, completes an operating circuit for the units guard preparation relay 640, the circuit extending from negative battery over the winding of relay 640, contacts 660*k*, contacts 626*j*–626*b*, and 624*a* of the guard relays 620*a*–620*j*, and contacts 652 to ground.

The "tens" registration on the guard relays has been cleared in this manner so that the guard relays may be further used in the determination of the value of the units designation of the calling line (in the exemplary call, line 10). Specifically as the units guard preparation relay 640 operates, it is effective at its contacts 642 to complete an obvious self holding circuit which extends over contacts 652 to ground; and at its contacts 643 completes an operating circuit for the units marking switching relay 660, the circuit extending from negative battery over the winding of relay 660, contacts 644, contacts 628j–628b, and 626a of the restored guard relays 680m to ground.

It will be recalled that a line circuit is operative in initiating a call to mark its "P-wire" (such as P-wire 494 associated with line circuit B) with negative battery, whereby the guard equipment will be able to tell which line of the ten lines in the group is initiating the call. The test to determine the unit identity of the calling line is made as the unit marking switching relay 660 now operates to extend the "P" wires of the ten lines associated with the selected "tens" group to the guard circuit, the P-wire extensions being effected at contacts 661a–661j of the switching relay 660. Inasmuch as subscriber B on line 10 of the group associated with the first tens group has initiated the call, the marking indication (negative battery) will be connected to P-wire 494 and an operating circuit will be completed to the tenth guard relay 620j, the circuit extending from positive battery over the winding of the tenth guard relay 620j, contacts 661j, contacts 680w, contacts 506, conductor 494, contacts 427, contacts 425, the lower winding of cut-off and lock-out relay 430, over the lower winding of line relay 420 to negative battery.

The tenth guard relay 620j operates and prepares an energizing circuit for the tenth units relay 530 (F0).

Specifically, the tenth guard relay 620j operates, and at its contacts 621j locks up to negative battery over contacts 622j, 641 and 680x and resistance 589; at its contacts 628j interrupts the energizing circuit for the units marking switching relay 660 to effect the restoration thereof; and at its contacts 627j closes a circuit for the line relay 560a in the link connector switch, the circuit extending from negative battery over the lower winding of connector link line relay 560, conductor 599, contacts 680i', 646 and contacts 627j, 628h–628b, 626a of the guard circuit and contacts 680m to ground.

The units marking switching relay 660 restores, and at its contacts 660k completes an operating circuit for the tenth units relay 530 (F0) as prepared by the tenth guard relay 620j, the circuit extending from negative battery over the winding of the tenth units relay 530 (F0), conductor 596, contacts 680h', contacts 625, 660k, 642 and 652 to ground.

The tenth units relay 530 (F0) operates and locks over an obvious circuit extending over resistor 588 and contacts 507 to ground.

At this point, the tens and units relays in the line finder associated with a calling line have been operated by the guard circuit, and have completed self holding circuits in the link. The operated tens and units relays (F10), (F0) are effective at their contacts 504, 505, 506; and 530', 531 and 532 respectively to extend the control path from the substation of the calling subscriber B to the connector control equipment, the path specifically extending from the substation over conductors 483, 484; over contacts 504, 505; contacts 530', 531; conductors 551, 552; over the upper and lower windings of connector line relay 560a to positive and negative battery respectively. Thus, a dialling loop is connected between the subscriber substation and the line relay in the link connector switch and control of the switching units thereat is given to the calling subscriber. The P-wire conductor is also extended to the subscriber line circuit, the path extending from the line circuit over conductor 494, contacts 506, 532 and conductor 553 to the connector switch.

It is noted that prior to the operation of the link units relays in the link finder switch and the extension thereby of a connection from the calling subscriber substation to the connector switch, the operated one of the guard relays was effective in the determination of the value of the units number of the calling subscriber to simultaneously connect ground to the connector line relay 560a, to aid relay 560a in operating in parallel with the line relay 420, the circuit having been described above. The operation of the appropriate finder tens and unit relays, 500 and 530 effect extension of a loop from the subscriber substation to relay 560a (which already is in the process of operating as a result of the circuit extended thereat from the guard circuit), and operation thereof over its two windings in series is effected. The connector line relay 560a in operating is effective at its contacts 561a to complete an obvious operating circuit for associated hold relay 570a.

It is, of course, apparent that as an idle link is seized in this manner, the allotter equipment must be operative to select a further idle link for use by calling subscribers who initiate further calls. The actual signal for effecting initiation of the searching for an idle link by the allotter is effected by a signal which is transmitted to the allotter by each link as seized, such signal being extended over the associated one of the signal leads 597a–j, which extends between the several links and the allotter. The transmission of an allotter shifting signal is effected by the seized link as the connector switch relay 570a operates, and at its contacts 573a disconnects negative battery from its marking lead 597a which extends to the allotter unit. The mark conductors 597a–j, in addition to providing means for signalling the allotter to advance in search of an idle link are also effective to mark the link as busy or idle, as will be described more fully hereinafter.

The connector switch also causes the line circuit to mark the line as busy to other subscribers and provides a holding circuit for the associate finder switch equipment. That is, as the hold relay 570a operates it is effective at its contacts 571a to connect ground to the hold wire 592, which serves as a further holding ground for the operated ones of the tens relay 500 (F10) as the link access relay 680 is subsequently released; at its contacts 571a connects ground over the P-wire circuit 553 extending to the subscriber substation, the circuit extending specifically over conductor 553, contacts 532, 506, conductor 494, contacts 427, 425, the lower winding of the cut-off and lock-out relay 430 and the lower winding of line relay 420 to negative battery to thereby complete an operating circuit for the cut-off and lock-out relay 430 and to hold the line relay 420.

As the cut-off and lock-out relay 430 operates, it is effective at its contacts 435 to interrupt its start ground or lead 498. It is, of course, obvious that if a second subscriber has lifted his receiver to initiate a call at this time, ground will have been connected to the common start lead 498 by the second calling subscriber.

Cut-off and lock out relay 430 is also effective at its make-before-break contacts 437 to extend ground over P-wire 485 to mark the line as busy to other subscribers, at its contacts 431 and 433 interrupts the original circuit extending to the line relay 420 (which holds over the energizing circuit which is completed over its lower winding), at its contacts 432 and 434 connect the circuit from the subscriber's substation to its first and second windings, and at its contacts 436 removes marking battery from the tens marking conductor 497.

When link relay 570a removes 60 ohm battery from lead 597a at contacts 573a, the allotter steps and the link access relay 680 restores, and is effective at its contacs 680a–z, a'–i' to disconnect the link from the guard circuit. With opening of contacts 680m, the holding circuit for the tens guard release relay 650 is interrupted, and with the opening of contacts 680x, the interruption of the holding circuit for the operated one of the tens guard relays (620j in the present example) is accomplished. Tens guard release relay 650 restores, and at its contacts 652 interrupts the holding circuit for the units guard preparation relay 640 to restore same.

As the allotter selects the next idle link, the link access relay 680 associated therewith will be immediately operated if another call is waiting with ground on the start lead 498, and the guard circuit operates to extend the line of the next calling subscriber to the newly seized one of the links.

*Line circuit operation on incoming call*

The calling party receives dial tone from the connector switch of the seized link in the conventional manner, and dials the number of the party desired. The connector operates to test the P-wire conductor of the called line in the manner well known in the art.

Assuming that the called party in the present arrangement is subscriber A (line 11), it is apparent from the foregoing description that if line 11 is busy, the cut-off and lock-out relay 410 associated with the line circuit for line 11 will be in the operated condition, and ground will be connected over contacts 407 and 417 and conductor 493 to the connector P-wire 482. If the line is busy due to a call to the line from some other connector, ground will have been placed on the P-wire 482 by the other connector, and lock-out ground through contacts 406 and 417 will be maintained on P-wire 482. The line circuit will therefore test busy to the connector in the conventional manner.

Assuming line 11 is idle as the connector tests for and finds an idle condition, ground is connected to the P-wire 482 by the connector, whereby a series energizing circuit is completed over the lower windings of the line relay 400 and cut-off and lock-out relay 410, the circuit extending from ground over conductor 482, contacts 418 and the lower windings of relays 410 and 400 to negative battery.

Inasmuch as line relay 400 in each of the line circuits is faster operating than its associated cut-off and lock-out relay 410, the line relay, such as 400, will operate and at its contacts 405 will prepare an alternative energizing circuit for the lower windings of relay 400 and 410; and at its contacts 401 and 403 momentarily transfers the positive and negative connections from the upper and middle windings of the cut-off and lock-out relay 410 to the start and tens mark circuits, such circuits being interrupted as the cut-off and lock-out relay 410 operate shortly thereafter. Inasmuch as the momentary energization of the start and tens mark lead is insufficient to seize a link, no operation is effected thereby at this time.

As the cut-off and lock-out relay 410 operates, it is effective at its contacts 411 and 413 to disconnect the upper winding of line relay 400 from the line conductors 480 and 481 to avoid shunting the ringing current when the line is presently rung over the positive and negative conductors 480 and 481 and also to avoid shunting the answer relays in the link; and at its contacts 415 and 416 interrupts a point in the start circuit and tens marks circuit respectively; and at its make-before-break contacts 417 establishes an alternative energizing circuit over the P-wire, such circuit extending from positive battery over the P-wire 482, contacts 417, 405 and the lower windings of the relays 410 and 400 to negative battery. The connection is completed in the normal manner as the called party removes his receiver.

*Release*

As the calling party returns his receiver to the hook switch of his substation set following completion of the call, the loop extending from the substation B to the connector of the seized link is interrupted to restore the connector line relay (such as illustrated line relay 560*a*) in the seized link. As the line relay 560*a* restores, it is effective at its contacts 561 to interrupt the holding circuit for the hold relay 570*a*. Inasmuch as relay 570*a* is slow-to-release, a brief period of time elapses prior to the restoration thereof. As relay 570*a* restores after the elapse of such period, it is effective at its contacts 571*a* to interrupt the holding circuit for the operated one of the finder tens relays (in the present example, relay 500 (F10)), at its contacts 571*a* removes ground from the connector P-wire 553 to effect the restoration of the line relay associated with the substation of the calling party (in the present example, relay 420), as well as the cut-off and lock-out relay 430 associated therewith. As is well understood, the release of the link hold relay such as 571*a* releases the connector which removes ground from the called P-wire releasing the called line and cut-off relays.

As the finder tens relay 500 (F10) restores, it is effective at its contacts 507 to interrupt the holding circuit for the operated one of the units relays (in this example relay 530 (F0)), and the tens and units relays are accordingly restored.

As the line relay 400 at the called party substation restores, it is effective at its contacts 406 to reapply ground to the connector P-wire 482. As the cut-off and lock-out relay 410 restores after the period of time determined by its slow-to-release characteristics, it is effective at its contacts 417 to interrupt the application of ground to the connector P-wire 482, whereby the line circuit LCA is restored for further use.

With reference to the line circuit of the calling party, it will be apparent that as the cut-off and lock-out relay 430 thereat restores, it is effective at its contacts 437 to remove ground from the connector P-wire 485, whereby calls may be established once more to the line circuit associated with line 10. Accordingly, the called and the calling line circuits are now in condition for reuse by the subscribers in the establishment of further calls.

In the connector switch, after the elapse of a brief period of time as determined by the slow-to-release operating characteristics of the hold relay 570*a*, the hold relay 570*a* restores, and at its contacts 573*a* reapplies negative battery to conductor 597*a* which leads to the allotter, to signal the allotter that it is once more idle and available for further use in the establishment of calls.

*Lock out*

It will be recalled that the line relay in the line circuits associated with the called and calling lines releases and operates more quickly than its associated cut-off and lock-out relay. The relays have been provided with these operating characteristics so that with the restoration of the line relays as a result of the calling party releasing the connection, a lock-out test may be made to determine the existence of a loop across the called line.

It should be understood that whenever the circuit to the line relay and the cut-off and lock-out relay is opened, a lock-out test for a loop or short across the line is made. In the event of the existence of such condition, as the line relay 400 restores, it will be effective to prevent the restoration of cut-off and lock-out relay 410, the lock-out relay 410 being held over a circuit extending from ground over contacts 402, the upper winding of lock-out relay 410, contacts 412, conductor 480, the loop which exists, the negative wire 481, contacts 414, the middle winding of relay 410, contacts 404 and resistance 447 to negative battery.

With the line relay 400 restored and the lock-out relay 410 held operated, ground is maintained on the P-wire 482 over contacts 406 and 417, whereby the line circuit is made busy to incoming calls, and the mark lead and start lead extending to the guard circuit are held open.

When the loop is removed from across the positive and negative wires 480, 481, the cut-off and lock-out relay 410 will be restored in accordance with its slow-to-release characteristics, whereby the positive and negative wire circuits are extended to the relay 400 at contacts 411 and 413 respectively; the tens and start marking conductor extending to the guard circuit are prepared at contacts 415 and 416 respectively, and ground is removed from the P-wire circuit at contacts 417.

*Allotter circuits*

The foregoing description for purposes of simplicity was directed primarily to the broader aspects of the allotter operation. The specific nature and details of operation of the allotter are now set forth.

With reference to Figure 2, there is illustrated thereat the manner in which two ten link-fifty line allotter units may be interconnected to provide a twenty link-one hundred line arrangement shown in Figures 2 and 3. The connection of these two allotters are shown in detail in Figures 7–10.

Considering first the operation of either of the allotters as a single unit, reference will be made to the first allotter as set forth in Figures 7, 8 and the response of such equipment in the preselection of idle links for the subscriber equipment. As heretofore mentioned, the allotters are mirror images of each other, and accordingly like members have been identified by like numbers in a different hundreds series.

Assuming the allotter of Figures 7 and 8 is to be connected for use with a ten link, fifty line arrangement, the key 880 will be operated to the "single-unit" position to effect closure of contacts 881.

The conductors **597*a*–597*j* extending between each of the ten links and the allotter arrangement is shown in Figure 7, portions of the link equipment being shown in schematic form to more clearly illustrate the manner in which the connectors signal the allotter equipment as to the busy and idle condition of the links. Linefinders and connectors are connected back to back to constitute links. Illustrated relay 580*a* is, of course, associated with the first link, relay 580*b* is associated with the second link, etc. Conductor 587**, which is common to all of the links, extend to the allotter and indicates by a guard signal the availability of an idle link.

*Allotter operation as originally energized*

Assuming initially that each of the tens links are idle, each of the link hold relays **570*a*–570*j* will be restored, and the link availability indication is transmitted thereby to the allotter, the guard signal being applied by contacts 572*a*–572*j* to conductor 587, contacts 882, 801, 881 and over the winding of the allotter access relay 850 to negative battery, whereby operation of the access relay 850 is effected. The link relays 570*a–j* are also effective at contacts 573*a–j* to connect low resistance battery to the marking conductors 597*a*–597*j* to indicate to the allotter stepping chain 750*a*–750*j*** that each of the links are in the idle condition.

Allotter access relay 850 operates and at its contacts 851 completes an operating circuit for the first stepping relay **750*a*; at its contacts 854 extends the start lead 498 to the allotter transfer relay 840; and at its contacts 856 completes an obvious operating circuit for overload indication relay 820**.

Overload indication relay 820 operates, and at its contacts 821–823 interrupts the circuits extending to the line circuits to prevent transmission of an indication of an overload at this time, it being apparent that relay 820 remains operated until such time as an all links busy condition occurs and the allotter access relay 850 is restored in response thereto.

The first stepping chain relay **750*a* operates over the circuit which is completed thereto, the circuit extending from negative battery over the winding of relay 750*a*, contacts 756*b*–756*j*, 791, conductor 715, and contacts 851 to ground. In operating the first stepping chain relay tests the marking conductor 597*a* which indicates the condition of the first link. That is, as the first relay 750*a* operates, it is effective at its contacts 752*a* to connect the marking conductor to the chain stop relay 740 whereby a circuit extends from negative battery over resistance 583*a*, contacts 573*a*, conductor 597*a*, contacts 752*a*–752*j*, the winding of stop relay 740 and contacts 743 to ground. Stepping relay 750*a* is simultaneously operative to extend an operating circuit to the second stepping chain relay 750*b*, the circuit extending from negative battery over the winding of relay 750*b*, contacts 753*a*, contacts 744, and 851** to ground.

It is apparent that since the first link is idle, the sixty ohm battery as connected over the test circuit to the stop relay 740 through contacts **752*a* of the first stepping relay 750*a*, will effect the operation of relay 740. Inasmuch as the stop relay 740 operates in about 15 milliseconds, the stop relay 740 will operate over the test circuit which has been connected thereto before the chain relay 750*b*** operates over the circuit which has simultaneously been extended thereto.

As the stop relay 740 operates, it is effective at its contacts 744 to interrupt the energizing circuit which has been completed to the second stepping relay **750*b* to prevent the operation thereof and further stepping of the chain; and at its contacts 741, 742, causes the common start lead 498 which extends to the subscriber's line circuit to be extended to the link access relay 680 associated with the first link, the circuit in the allotter extending from conductor 498 over contacts 854, the upper winding of relay 840, conductor 709, contacts 741, contacts 751*a* and conductor 704 to the link access relay 680 associated with the first link and negative battery. Stop relay 740 is also effective at its contacts 743 to interrupt its original energizing circuit and connect a resistance 745** in series therewith for the purpose of minimizing current drain in the conventional manner.

The allotter has thus effected selection of the first link and connected same to the start lead 498 for use by the first calling subscriber. The allotter remains in this condition, i.e., relays 740, **750*a*, and 850** operated, until the preselected link is seized by a calling subscriber and a signal is received from the seized link indicating that a further idle link should be preselected by the allotter in preparation for the next call.

As a calling subscriber initiates a call, the seizing signal connected to the start lead 498 by the line circuit is extended over the desired allotter path to the link access relay 680 to effect the operation thereof.

The link access relay 680 in the idle link operates to effect operation of the guard circuit as described heretofore, which in turn causes the finder equipment to extend the calling subscriber line to the link connector switch.

With the initiation of a call by a calling subscriber and the extension of the start lead through the allotter circuit, an energizing circuit is completed for the upper and lower windings of differential relay 880 in the allotter circuit, the upper winding being in series with the circuit for the link access relay. Since the relay is differentially wound, it is apparent that the relay will not operate at this time.

At the time that the calling subscriber line is extended to the connector switch of the seized link the connector switch relay **570*a* is operated as heretofore described, and at its contacts 573*a* disconnects the "link-idle" signal from conductor 597*a* to thereby effect restoration of the chain stop relay 740**.

Stop relay 740 restores to initiate stepping by the chain in search of an idle link, the relay 740 being effective at its contacts 744 to complete an operating circuit for the second step relay **750*b*, which extends from negative battery over the winding of relay 750*b*, contacts 753*a*, contact 744, conductor 715, and contacts 851 to ground. The second stepping relay 750*b* operates, and at its make-before-break contacts 755*b*, 756*b*, interrupts the energizing circuit for the first stepping relay 750*a* to effect the restoration thereof, and completes an obvious self-holding circuit; at its contacts 751*b* prepares the start lead 498 for extension to the second link; at its contacts 752*b* interrupts a further point in the test circuit for the first link; at its contacts 753*b* extends the testing circuit for the second link to the stop relay 740**, and at its contacts 754*b* completes an energizing circuit for the third step relay 750*c*, the circuit extending from negative battery over the winding of relay 750*c*, contacts 754*b*, contacts 744, conductor 715 and contacts 851 to ground.

If the second link is idle the marking signal comprising 60 ohm battery will be connected to the marking lead 597*b*, and such signal will be transmitted to the allotter over the circuit extending from negative battery over resistor 583*b*, contacts 573*b*, conductor 597*b*, contacts 753*b*, 752*c*–752*j*, and the winding of relay 740 and contacts 743 to ground, whereby the stop relay 740 will operate prior to operation of the third chain relay 750*c* to thereby terminate advancement of the chain. Specifically, stop relay 740 operates, and at its contact 744 interrupts the chain advancing circuit, and at its contacts 742 extends the start lead 498 to the second link access relay whereby the second link is now prepared for seizure. As a subsequent call is initiated by a subscriber, such circuit extends over contacts 854, the upper winding of relay 840, conductor 709, contacts 742, 751*b*, and conductor 705 to the link access relay 680 and battery associated with the second link. Thus, as a subsequent calling subscriber initiates a call, the line circuit connects ground to the start lead 498. Such ground is extended to the link access relay 680 associated with the second link, and the link operates in the manner described to extend the connection to the connector switch. As the connection is thus extended, the connector switch operates to signal the allotter to search for an idle link for use by a subsequent calling subscriber.

In the event that the second link was busy at the time the second step relay 750*b* was operated, the absence of 60 ohm battery on the test circuit as extended to the stop relay 740 prevents operation of the stop relay 740, and accordingly the operating circuit completed by the second step relay to the third step relay 750*c* becomes effective. The third step relay 750*c* operates, and at its contacts 753*a* extends the testing circuit for the third link to the stop relay 740, and at its contacts 754*c* extends an operating circuit to the fourth stepping relay 750*d* (not shown). In the event that the third link is idle, stop relay 740 operates to effect seizure of the idle link and prevent further hunting by the allotter equipment. If, however, the third link is also busy, the fourth stepping relay operates to test for an idle condition of the fourth link. It is apparent that the allotter will step in this manner in search for an idle link and as such is discovered, will terminate its search and connect same for use by the calling subscribers.

As the stepping chain advances with the receipt of the subsequent calls to seize the tenth link, the connector relay 570*j* operates in the manner of the like relays in the previously operated connectors to release the stop relay 740. As a result of the operated condition of the tenth relay at this time, an operating circuit is completed for the transfer relay 790, the circuit extending from negative battery over the upper winding of relay 790, contacts 754*j*, 744, conductor 715 and contacts 851 to ground. As noted earlier, the operation of the allotter access relay 850 is dependent upon the application of ground to conductor 587 by an idle link over its associated set of the contacts 572*a*–572*j*. It is, of course, apparent that if all of the links are in use, no ground will be connected to conductor 587, and as the stop relay 740 restores following seizure of the tenth link, the allotter access relay 850 will also be in the restored condition and the chain advancing ground normally provided by contacts 851 will be absent. Accordingly, as the stop relay 740 restores to initiate stepping of the chain, the absence of the chain advancing ground on conductor 715 prevents further cycling of the chain, it being apparent that recycling at this time would be fruitless in that there are no further links to seize. As relay 850 restores, it is also effective at its contacts 851 to interrupt the energizing circuit for the tenth stepping relay 750*j* to restore same; and at its contacts 856 interrupts the holding circuit for alarm relay 820, which restores. As alarm relay 820 restores, it is effective at its contacts 822 to initiate operation of the tone circuit; at its contacts 821 connects the tone circuit to the all trunks busy conductor 807 extending to the line circuits, and at its contacts 823 connects the start lead 498 to the over load indication circuit over conductor 896, whereby subsequent calls made during the period that no links are available will cause associated equipment to register an indication of such condition on the meter circuit associated therewith. The allotter remains in this condition, i.e., all relays restored until such time as a link becomes idle.

As a link becomes idle, the hold relay 570*a* associated with the idle link restores, and at its contacts 572 applies ground to its conductor 587 to effect the operation of the allotter access relay 850. As relay 850 operates, it is effective at its contacts 851 to apply chain advancing ground to conductor 715 to operate the first allotter relay 750*a* and thereby cause the chain to step until such time as the test circuit is completed to the first idle one of the links. Stop relay 470 then operates as before to stop searching in the allotter and to extend the start lead into such link in preparation for seizure.

Assuming that a link was available as the tenth link was seized, the allotter access relay 850 will have been in the operated condition, and as the stop relay 740 was restored as a result of the seizure of the tenth link, an operating circuit was completed for the transfer relay 790, the circuit extending from negative battery, the upper winding of relay 790, contacts 754*j*, 744, conductor 715 and contacts 851 to ground. Transfer relay 790 operates, and at its contacts 791 interrupts the holding circuit for the tenth stepping relay 750*j* to effect the release thereof, which relay in restoring is effective at its contacts 754*j* to interrupt the energizing circuit for the transfer relay 790.

Transfer relay 790 restores, and at its contacts 791 now completes the original energizing circuit for the first stepping relay 750*a* in the chain, and causes the chain to step along in the manner heretofore described to locate an idle one of the links.

The equipment also includes a line-finder alarm arrangement which is operated by the allotter whenever the allotter has received an indication that there is an idle link and is unable to locate same.

Specifically, whenever a link is idle the allotter access relay 850 will be in the operated condition, and accordingly, as the calling subscriber lifts his receiver and his associated line circuit responsively applies ground to the common start conductor 498, such ground is extended over contacts 854 to the upper and lower windings of the differential relay 840. Normally the circuit is completed over the upper winding to the preselected link simultaneously with the completion of the circuit over the lower winding. In that the windings are differently wound, no operation of relay 840 is effected. However, if an open condition exists between the calling subscriber line circuit and the link access relay, the upper winding of relay 840 will not be energized and relay 840 will operate.

Assuming, as an example, that the link access relay 680 associated with the third link has an open coil and the chain equipment is in operation searching for an idle link. As the chain steps to the third stepping relay 750*c* to operate same, the chain relay 750*c* at its contacts 753*c* extends the marking conductor 597*c* associated with the third link to the stop relay 740, and at its contacts 751 extends the seizing signal via contacts 741 from the start conductor 498 to the link access relay 680 associated with the third link in an attempt to operate same, this circuit being completed when the stop relay 740 operates.

Since the link is idle, the stop relay 740 operates in the manner heretofore described, and at its contacts 744 interrupts the chain advancing circuit, whereby the chain will terminate its searching activities. However, as the third chain relay extends the seizing signal to the link access relay (via contacts 741 when stop relay 740 operates), and fails to reach same by reason of the open condition, the upper winding of the differential relay 840 will not be energized, and differential relay 840 will operate. Relay 840 at its contacts 841 completes an energizing circuit to the slow-to-operate relay 830. In the event that the fault persists for longer than one second, relay 830 will operate and at its contacts 832 extends an obvious energizing circuit to associate relay 810. Relay 830 is made slow-to-operate by means of the 100 mf. condenser 834 shunting circuit, which while the condenser is being slowly charged through resistor 836 in the operating path for relay 830, prevents relay 830 from getting its full operating current. As the conductor 834 has been sufficiently charged and is absorbing a very small charge current, relay 830 operates.

The associate relay 810 operates to cause the chain to bypass the faulty third link and to proceed in its search for an idle link. That is, relay 810 is effective at its contacts 815 to complete a circuit from ground over contacts 841, 815, 804, conductor 716 and contacts 754*c* to the fourth counting relay 750*d* (not shown) to effect the operation thereof.

The fourth counting chain relay 750*d* operates, and at its contacts 752*d* (not shown) interrupts the testing circuit which extended from the third link to the stop relay 740 to restore same, and at its contacts 753*d* connects the testing circuit for the fourth link to the stop relay 740. If the fourth link is idle, the stopping relay 740 will operate to terminate chain advancement and the preselection of the fourth link will be obtained as before described. In the event that the fourth link is not idle, the stop relay 740 will remain restored, and the searching continues until an idle link is found.

Simultaneously with operation of relay 810 to transmit the pulse which causes the chain to bypass the particular link in which the fault occurred, relay 810 is also effective at its contacts 811 to complete an obvious locking circuit for itself, at its contacts 812 releases relay 830; at its contacts 814 completes an energizing circuit over condutor 804' for the attendant alarm equipment; at its contacts 813 prepares an operating circuit for relay 800; at its contacts 816 closes a circuit through 500 ohm resistor 837 to discharge the conductor 834, this discharge circuit being subsequently opened at contacts 805 by relay 800.

Relay 830 releases and at its contacts 833 completes and operating circuit to relay 800, the circuit extending from ground over contacts 841, 833, 813 and the winding of relay 800 to negative battery.

As relay 800 operates upon the release of 830, it is effective at its contacts 804 to interrupt the circuit closed by relay 810 to the allotter circuit stepping chain, which is presently proceeding under its own power—i.e., the chain advancing ground which is being extended over conductor 715.

Relay 800 at its contact 804 locks over contacts 815 of relay 810 to the original operating ground which extends over contacts 841 independent of relay 830, and closes a new slow operating circuit for relay 830 which is to operate in the event of continuing failure by the equipment to seize an idle link. This circuit extends from ground over contacts 841 of relay 840, contacts 815 of relay 810, contacts 806 and 803 of relay 800 through resistor 836 to relay 830 and conductor 834. If the trouble condition continues to be indicated for another second, relay 830 operates. Now with both relays 800 and 830 operated, the idle links indication circuit over lead 587 is opened at contacts 801 and 831 causing release of allotter access relay 850, which in turn causes complete release of any operated allotter chain relays as well as relays 840, 800, 810, 830. When, through the release of relays 800 and 830 the circuit over lead 587 is reclosed, relay 850 reoperates, in turn operating relay 750*a* for a new cycle of the stepping chain.

If, however, an idle link is found on the first cycle and relay 740 is operated thereby, the ground on the start lead 498 will find negative battery over both windings of the differential relay 840, and the differential relay 840 will restore. The circuit over the upper winding extends over the link access relay 680 associated with the idle link which is found to negative battery. As relay 840 restores, it is effective at its contacts 841 to interrupt the holding circuit for relays 810 and 800, which are thereby restored.

The equipment is now in its normal condition, and link selection will take place in the manner heretofore described, the equipment utilizing the remaining nine links in the unit (and the ten links in the other unit if so connected) to establish calls in the normal manner. The inoperative link is bypassed with each encountering thereof.

If the failure is an allotter chain failure, the forced release of relay 850 after a second operation of relay 830 (as described above), permits reuse of the part of the stepping chain prior to the point of failure therein.

The alarm circuit for the visual or audio signalling means (not shown) which are connected to conductor 804' may provide either or both types of signalling to the attendant in an obvious manner.

*Two unit operation*

Two individual fifty-line, ten allotter link units may be interconnected through the means of conventional jack plugs and cables to provide a one hundred line-twenty link arrangement, the manner in which the equipment is connected and the schematic illustration of the resulting connections being shown in Figures 2 and 3 respectively. The interconnection of two units is illustrated in more detail in Figures 7, 8, 9 and 10 respectively, wherein cable and plug-in-jacks are arranged to interconnect conductors 886—893 and 897—898 of the two allotter units.

Switches 860 and 1060, as shown in Figures 8 and 10, are each operative to two given positions (A and B), the switches 860 and 1060 in their A positions effecting closure of contacts 861, 1061, etc., and in their B positions effecting closure of contacts 862 and 1062 etc.

The switch members 860 and 1060 are always moved to unlike positions, that is, if one switch is in the A position, the other switch must be moved to the B position. The purpose of the switches is to determine the initiating point for each cycle of the two allotters as interconnected. That is, with key 860 in the A position, and key 1060 in the B position, the starting point for the allotters will be link 1 of allotter 1 and the end point will be link 10 of allotter 2. Link rotation as indicated in the first sketch of Figure 3A will then be allotter #1, links 1, 2, 3, 4, 5, 6, 7, 8, 9 and 10, and then allotter #2, links 1, 2, 3, 4, 5, 6, 7, 8, 9 and 10.

With key 860 in the B position and key 1060 in the A position, the starting point would be link 1 of allotter #2 and the end point would be link #10 of allotter 1, as shown in the second portion of Figure 3A. Link rotation would then be initiated with the first link of allotter #2 and proceed over links 1, 2, 3, 4, 5, 6, 7, 8, 9 and 10 thereof, and thereafter the first link of allotter #1 followed by links 2, 3, 4, 5, 6, 7, 8, 9 and 10 thereof.

The operation of the equipment in either sequence is similar, and accordingly the operating characteristics of the two allotters in either connection will be apparent from the following description wherein key 860 is assumed to be operated to the A position, and key 1060 is operated to the B position to provide "A—B" operation. Key 880 will be operated to the two unit position illustrated in Figure 7, and key 1080 to the corresponding position.

In the connection of two allotters to provide a twenty link-one hundred line arrangement, the access relays 850 and 1050 and the transfer relays 790, 990 are provided with interrelated operating and locking circuits to insure operation of the links according to a predetermined plan, the nature of the plan varying in accordance with the location of the links available as each cycle of an allotter is completed.

Assuming A—B operation, with the initial energization of the equipment, the first allotter will be energized to cause the first link thereof to be made available for the first incoming call. Such precedence of operation is obtained by having the allotter access relay 850 for the first allotter operative with the application of ground to marking conductor 587 by one or more of the other links associated with the first allotter. More specifically, the operating circuit for the access relay 850 in the first allotter extends from negative battery over the winding of relay 850, contacts 868, conductor 889, contacts 1067, 1075, 1055, 1069, 890, 870, alternative contacts 801 and 831, contacts 882 and conductor 587 to the ground applied thereto by one or more of the idle links associated with the first allotter. The access relay 850 operates, and as described heretofore, provides chain advancing ground to cause the chain to search for the idle link associated therewith.

It is noted that if the two allotters were connected for B—A operation, the second allotter would be rendered effective first in the sequence, the access relay 1050 therein being connected in such case to the conductor 583 as one or more idle links are associated with the second allotter. The operating circuit for the access relay 1050 in such case is apparent from the aforegiven description of the operating circuit for relay 850 in the A—B arrangement.

The operation of an allotter to find an idle link as its access relay 850, 1050 is rendered operative, is similar to that set forth in the description of the equipment when operated as a single unit. However, as the cycle is run and the equipment arrives at the tenth (or the last idle link of a group), the equipment must examine the links associated with the two allotters and determine the further operating sequence in accordance with the condition of the links thereat.

More specifically, it is apparent that as the tenth link of the first allotter is seized, the equipment must test for the existence of four possible conditions as follows:

(*a*) There may be links idle in both allotters;

(*b*) There may be links idle in the second allotter alone;

(*c*) There may be links idle in the first allotter alone;

(*d*) There may be no links idle in either allotter.

The same four conditions may exist when the tenth link of the second allotter is seized. The manner of operation of the equipment to test for these conditions, and the sequence of testing will now be more fully discussed.

*Seizure of tenth link, first allotter—No links idle in either allotter*

Assuming the stepping chain in the first allotter has stepped to the tenth link and that at this time there are no links idle in either allotter, it is apparent that the marking of ground will be removed from conductor 587 by the last link to be seized. That is, relay 570 in the last link to be seized is operative at its contacts 572, to remove marking ground from conductor 587 and simultaneously at its contacts 573 interrupts the energizing circuit for the stepping relay 740.

Allotter access relay 850 and the stepping relay 740 restore. Allotter access relay 850 in its restoration is effective at its contacts 851 to interrupt the holding circuit for the operated one of its stepping relays to effect the restoration thereof (the alternative circuit normally completed in the second allotter being interrupted at this time by reason of the open contacts 1051 on restored relay 1050), and at its contacts 856 interrupts the energizing circuit in the first allotter for the overload indication relay 820. With two unit operation, leads 892 of both allotters are multiplied as before mentioned by means of plug and jack arrangements so that contacts 856 or 1056 can maintain both relays 820 and 1020 operated. With relay 1050 nonoperated due to no links available in the second unit, the opening of contacts 856 releases both relays 820 and 1020.

Overload indication relay 820 restores, and at its contacts 822 starts the tone circuit; at its contacts 821 connects busy tone over conductor 807 to the line circuits of the first unit to provide an all trunks busy tone therefor, and at its contacts 823 connects the start lead 498 to the meter circuit so that calls attempted by subsequent calling subscribers will be recorded in the metering circuit. Relay 1020 accomplishes the same functions in the second unit.

It is noted that in such arrangement the transfer relay 790 is not operated.

As a link becomes idle in the first allotter, the allotter access relay 850 associated with the first allotter unit is operated over its initial energizing circuit described heretofore, and the chain is energized as before to step over the testing circuits in search of the idle link.

Should a link become idle in the second allotter unit, the transfer relay 790 in the first allotter is operated to shift the searching operation to the second allotter.

Specifically, as a link associated with the second allotter becomes idle, it is effective at its contacts, such as illustrated contacts 572, to apply ground to marking conductor 583 to indicate to the system that a link associated with the second allotter is idle. The marking signal is extended over conductor 583, contacts 1082, alternative contacts 1001–1031, contacts 992, 1052, 1063, conductor 887, contacts 864, contacts 874, 855, 876 and conductor 718 to the lower winding of transfer relay 790 in the first allotter.

The transfer relay 790 operates, and at its contacts 793 extends the marking ground of the second allotter to its access relay 1050, the operating circuit specifically extending from negative battery over the winding of relay 1050, contacts 1071, conductor 891, contacts 872, conductor 717, contacts 793, conductor 724, contacts 862, conductor 886, contacts 1061, alternative contacts 1001 and 1031, contacts 1082, conductor 583 to the ground provided by the idle link of the second allotter.

The allotter access relay 1050 associated with the second allotter unit operates, and at its contacts 1055 interrupts the energizing circuit for the transfer relay 790 in the first allotter to restore same, and at its contacts 1051 applies chain advancing ground to conductor 915 to cause same to operate in search of the link which has been indicated as idle.

Relay 1050 locks over the following path: 1050, contacts 1053, 992, conductor 915, alternative contacts 1001 and 1031, contacts 1082 to ground on lead 583.

*Idle links in the first allotter alone*

Assuming there are no idle links in the second allotter as the first allotter arrives at the tenth relay of its chain, and that there are idle links in the first allotter, the equipment must be operative to effect recycling of the first allotter unit.

It is apparent that with the existence of such condition marking conductor 587 for the first allotter will be marked to indicate the availability of a link thereat and conductor 583 associated with the second allotter will not be marked, whereby the equipment is informed of the inaccessibility of a link thereat. Thus, as the stop relay 740 is restored following seizure of the last available link in the first unit (and assuming other links prior thereto in the first allotter are idle), the chain steps to the tenth relay 750*j* which, in turn, effects operation of the transfer relay 790, such circuit extending from negative battery over the upper winding of relay 790, contacts 754*j*, 744, conductors 715 and contacts 851 to ground. If the last link seized was the tenth link, it is apparent that restoration of the stop relay will directly complete the operating circuit for the transfer relay 790.

As transfer relay 790 operates, it tests for the existence of idle links in the other allotter. As shown in more detail hereinafter, in the event that there are idle links in the second allotter, relay 1050 thereat will be operated as a result of the test, and the second allotter will take over in the search for an idle one of the links thereat.

Inasmuch as it has been assumed that all the links in the second allotter are busy, each of the link relays 570*k*–570*t* will be operated and contacts 572*k*–572*t* will have disconnected ground from marking conductor 583. Thus, although the transfer relay 790 operates over the circuit which has been extended over its upper winding, the second allotter fails to provide the signal for the lower winding indicating links are available thereat, and accordingly as transfer relay 790 at its contacts 791 effects interruption of the energizing circuit for the tenth stepping chain relay 750*j*, it restores and in turn at its contacts 754*j* interrupts the energizing circuit for the upper winding of transfer relay 790 and restores same. As shown hereinafter in more detail, if an idle link is available in the second allotter, transfer relay 790 would be held over its lower winding and transfer to the second allotter would be accomplished.

As transfer relay 790 restores, it is effective at its contacts 791 to connect the chain advancing ground to the stepping chain of the first allotter to cause same to search for the idle link in the manner heretofore described.

*Links idle in both allotters*

In the event that links are idle in both the first allotter and the second allotter groups as the first allotter advances to the tenth link, the equipment must be operative to transfer operation to the second allotter. Specifically, as the last available link of the first allotter is seized, the equipment operates to complete an operating circuit for the transfer relay 790. As described above, transfer relay 790 tests for the existence of an idle link in the second allotter and effects transfer of the selecting operation to the second allotter. That is, with the existence of idle links in both allotters, the marking conductor 587 and 583 in both allotters will be so marked. Thus, as the transfer relay 790 is operated by the energizing circuit completed over its upper winding by the first allotter, the transfer relay is held by the circuit extended over its lower winding as a result of the existence of an idle link in the second allotter group. Specifically, the holding circuit for relay 790 extends from negative battery over the lower winding of relay 790, contacts 794, conductor 719, contacts 864, conductor 887, contacts 1063, contacts 1052, conductor 919, contacts 992, conductor 914, contacts 1001 or 1031, contacts 1082, conductor 583 and contacts 572 of the idle link to ground.

Transfer relay 790 at its contacts 793 is operative to extend such ground to the allotter access relay 1050 in the second allotter, the energizing circuit therefor extending from negative battery over the winding of access relay 1050, contacts 1071, conductor 891, contacts 872, conductor 717, contacts 793, conductor 724, contacts 862, conductor 886, contacts 1061, alternative contacts 1001 or 1031, contacts 1082, conductor 583 to the ground applied at contacts 572 by the idle one of the relays 570.

The allotter access relay 1050 operates, and at its contacts 1053 locks to the ground provided by the idle ones of the links, such locking circuit extending from negative battery over the winding of relay 1050, contacts 1053, conductor 919, contacts 992, conductor 914, alternative contacts 1001 or 1031, contacts 1082, and conductor 583 to the ground provided by the closed contacts 572 of the idle link.

Allotter access relay 1050 in the second allotter unit at its contacts 1052 and 1055 effects further restoration of the first allotter equipment, it being effective at contacts 1052 to interrupt the holding circuit for the transfer relay 790 thereat which restores; and at its contacts 1055 interrupts the holding circuit for the allotter access relay 850 in the first unit to effect the restoration thereof, even though there may be idle links available in the first allotter. In this manner the selecting function is fully transferred to the second allotter.

Allotter access relay 1050 at its contacts 1051 provides operating ground for the stepping relays of the chain in the second allotter, and the chain relays step along as described heretofore in search of an idle link.

*Idle links in the second allotter alone*

Assuming that there are no idle links in the group associated with the first allotter as the last available link is seized, and assuming that there are idle links in the second allotter, the equipment must be operative to transfer the selecting operation thereto. In that there are no idle links in the group associated with the first allotter, ground will be removed from the marking conductor 587 associated therewith and the allotter access relay 850 will restore, and the chain advancing circuit will be interrupted at contacts 851. The operated one of the chain relays (the relay associated with the last link seized) will restore.

As allotter access relay 850 restores, it is also effective at its contacts to test for the presence of idle links in the second allotter unit by extending the marking conductor 583 thereof to the transfer relay 790 associated with the first allotter. Since links are idle in the second allotter, ground will be connected thereto, and the transfer relay 790 will be operated as the allotter access relay 850 restores, the ground of marking conductor 583 in the second allotter being extended over a circuit which extends from negative battery over the lower winding of relay 790, conductor 718, contacts 876, 855, 874, 864, conductor 887, contacts 1063, contacts 1052, conductor 919, contacts 992, conductor 914, alternative contacts 1001 and 1031, contacts 1082, conductor 583 and contacts 572 of an idle one of the links.

Transfer relay 790 operates, and at its contacts 794 locks up to the second allotter over conductor 719, contacts 864, conductor 887, contacts 1063, 1052, 992, conductor 914, contacts 1001 or 1031, contacts 1082, conductor 593 and contacts 572 of the operated one of the idle links for the period that the transition is taking place so that even though a link becomes idle in the first allotter during this period and the allotter access relay 850 is activated thereby, the transfer relay 790 will not be restored.

Transfer relay 790 operates as described above to effect transfer of the selecting operation to the second allotter, such transfer being effected by completing the operating circuit to the allotter access relay 1050 associated with the second allotter unit. The allotter access relay 1050 operates to accomplish the transfer operation as above described and to complete the operating circuit for the stepping chain associated with the second allotter to cause same to search for the idle one of the links therein.

*Advancement to the tenth link of the second unit—No links available in either allotter*

Assuming the equipment is connected for A—B operation, and that the links in both allotter groups are busy as the tenth and last idle link of the second selector is seized, the equipment must be operative to prevent a fruitless search for a nonexistent idle link; to signal the subscriber of such condition; and to prepare a circuit to the overload meter for the purpose of recording the number of calls which could not be completed as a result of such condition.

As the link hold slave relay 570*t* associated with the tenth link of the second unit operates to effect the restoration of the stop relay 940, it is also effective at its contacts 572t to effect the restoration of the allotter access relay 1050 for the second allotter.

Allotter access relay 1050 restores, and at its contacts 1051 interrupts the holding circuit for the stepping relay associated with the seized link, and interrupts the chain advancing circuit. The selecting equipment in both allotters is now in the restored condition.

Allotter access relay 1050 is also effective at its contacts 1056 to disconnect ground from the overload indication relays 1020 and 820 to effect the restoration thereof (the alternative ground being removed by reason of the restored condition of relay 850 in the first allotter) which relays in restoring are operative as aforedescribed to start the tone circuit; to extend an all trunks busy signal to the line circuits; and to prepare a circuit to the overload meter indication circuit for the purpose of recording subsequent calls which are attempted and not completed by reason of the busy condition of the links.

The allotter access relay 850 and 1050 remain in the restored condition until such time as a link becomes idle in one of the units. If a link becomes idle in either allotter, ground is connected to the associated one of the marking leads, such as 587 or 583, and the equipment operates in the manner set forth previously as the links of both allotters were found busy following advancement of the equipment to the tenth step of the first allotter.

*Links available in the second allotter unit only*

As the last available link in a cycle of the second allotter is seized and the relay 570 associated therewith is operated, the contacts 573 associated therewith interrupt the energizing circuit for the stop relay 940, which restores, and at its contacts 944 closes the stepping circuit, and with relay 950j operated, completes an operating circuit for the transfer relay 990, the circuit extending from negative battery over the upper winding of relay 990, contacts 954j, contacts 944, conductor 915 and contacts 1051 to ground. Transfer relay 990 operates, and at its contacts 991 interrupts the holding circuit for relay 950j in the second allotter unit to effect the restoration thereof.

At this time the transfer relay 990 must decide which of the allotter units is to become effective for use in the extension of further subscriber calls. In the event that there are idle links in the first allotter, transfer should occur to the first allotter. However, in the event that there are no idle links in the first allotter, the idle links in the second allotter should be utilized.

Accordingly, the transfer relay 990 at this time makes a test of the condition of the links in the two allotters. Specifically, relay 990 operates, and at its contacts 994 tests for the existence of ground on conductor 587 (it being remembered that ground is applied at contacts 572 by the hold relay 570 of an idle link associated with the first allotter). Such test is specifically made over the circuit extending from negative battery over lower winding of relay 990, contacts 994, conductor 925, contacts 1065, conductor 888, contacts 866, contacts 852, conductor 725, contacts 792, conductor 714, alternative contacts 801 or 831, contacts 882, to conductor 587 to test for the existence of ground thereon. Since we are assuming that all the links in the first allotter are busy at this time, no ground will be found on conductor 587, and it will not be possible for transfer relay 990 in the second allotter to lock up thereto.

Transfer relay 990 in operating was also effective at its contacts 992 to interrupt the holding circuit for the allotter access relay 1050 for the second allotter to restore same. As a result of the fact that the transfer relay 990 could not find marking ground on conductor 587 in its test for the presence of an idle link in the first allotter, relay 1050 is effective at its contacts 1051 as it restores to interrupt the energizing circuit for the upper winding of relay 990, and the release thereof is accomplished. Relay 950j is also restored and further interrupts the energizing circuit for the upper winding of transfer relay 990.

It is again noted that the allotter access relay 850 associated with the first allotter unit was not operated at this time because of the absence of ground on conductor 587. However, precautionary measures are taken to prevent completion of an operating circuit to the transfer relay 790 in the first allotter during this testing operation. Thus, if a link does become idle in the first allotter during this period, allotter access relay 850 will operate without effect.

More specifically, the operating circuit for the transfer relay 790 at this time is extended from negative battery over the lower winding of allotter transfer relay 790, conductor 718, contacts 876, contacts 855, 874, 864, conductor 887, contacts 1063, 1052, conductor 919, contacts 992, conductor 914, alternative contacts 1001, 1031, contacts 1082, conductor 583 to the ground applied thereto by the idle one of the links.

If at the instant relay 1050 releases, ground would reappear on link idle indication lead 587a, link access relay 850 would start operating. At the same time relay 1050 at its contacts 1055 completes an operating circuit for transfer relay 790. Since relay 850 is faster operating than relay 790, relay 850, at its contacts 855, interrupts the energizing circuit for relay 790 to prevent operation thereof, and transfer occurs as explained hereinafter.

Assuming such condition does not accur at this time, transfer relay 790, having been operated by the ground from the second allotter, recognizes the fact that an idle link is available in the second allotter, and is accordingly operative at its contacts 792 to interrupt a further point in the energizing circuit for allotter access relay 850 to prevent the operation thereof should a link become idle in the first allotter during the testing period, and at its contacts 793 completes an operating circuit for the allotter access relay 1050 in the second allotter to cause same to assume the link selecting operation, the circuit extending from negative battery over the winding of relay 1050, contacts 1071, conductor 891, contacts 872, conductor 717, contacts 793, conductor 724, contacts 862, conductor 886, contacts 1061, alternative contacts 1001 and 1031, contacts 1082 and conductor 583 to the ground applied thereto by the idle one of the links.

Allotter access relay 1050 operates, and at its contacts 1052 interrupts the energizing circuit for the transfer relay 790 in the first allotter circuit to effect the restoration thereof, and at its contacts 1055 interrupts a further point in the operating circuit for the access relay 850 in the first allotter, and at its contacts 1051 extends the chain advancing ground to the allotter chain to cause same to select idle ones of the links in sequence for each of the incoming calls.

As the allotter is again advanced to the last link in the sequence, it effects reexamination of the condition of the links in the two allotters as before to determine which link is to be effective.

*Link idle in both allotters*

In the event that there are idle links in each of the two allotters as the last available link associated with the second allotter is seized, and the chain advances in the cycle to the tenth relay, the equipment should be operative to effect transfer to the first allotter. The test for the condition of the links associated with the two allotters is made by the transfer relay 990 which is operated as the chain is advanced past the tenth stepping relay in the completion of a search cycle in the manner heretofore described.

That is, as the stopping relay 940 restores responsive to receipt of the signal from the last link seized in the circuit cycle, it is effective at its contacts 944 to complete the chain advancing circuit, which advances to the transfer relay 990. In that no other links in the remaining group of the sequence are idle, an operating circuit is completed for transfer relay 990, which extends from negative battery over the upper winding of relay 990, contacts 954*j*, 944, conductor 915 and contacts 1051 to ground.

Transfer relay 990 operates, and at its contacts 992 interrupts the holding circuit for allotter access relay 1050, which restores, and at its contacts 991 interrupts the holding circuit for the tenth stepping chain relay 950*j* to effect the release thereof. As relays 1050 and 950*j* restore, they are effective at their contacts 1051 and 954*j* respectively to interrupt the original energizing circuit for the transfer relay 990. It will be recalled that transfer relay 990, in its operation tests for the existence of ground on conductor 587 to determine whether or not there are idle links in the first allotter, and upon finding such ground will lock up thereto and transfer the selective operation to the first allotter. The signalling circuit from the allotter which operates transfer relay 990 in such event extends from negative battery over the lower winding of relay 990, contacts 994, conductor 925, contacts 1065, conductor 888, contacts 866, contacts 852, conductor 725, contacts 792, conductor 714, alternative contacts 801 and 831, and contacts 882 to ground on conductor 587 as provided by the idle links in the first allotter.

Thus, as the allotter access relay 1050 restores to interrupt the original energizing circuit for the transfer relay, the transfer relay is nevertheless held operated by the signal from the first allotter that idle links are to be found therein, and the transfer of the selecting operation is now made thereto. That is, allotter access relay 1050 in restoring is also effective at its contacts 1055 to complete an operating circuit for the allotter access relay 850 in the first allotter arrangement, such circuit extending from negative battery over the winding of allotter access relay 850, contacts 868, conductor 889, contacts 1067, 1075, 1055, 1069, conductor 890, contacts 870, alternative contacts 801 and 831, and contacts 882 to the ground on conductor 587 as placed thereupon by the idle one or ones of the links.

Allotter access relay 850 operates, and at its contacts 852 interrupts the energizing circuit for the transfer relay 990 in the second allotter unit to effect the release thereof, and at its contacts 851 provides ground to the chain to advance same in search of an idle link. Link selection is now effected in the first allotter in the manner heretofore described.

*Links available in first allotter unit alone*

As the last idle link in the second allotter is seized, the allotter should be operative to test for the existence of idle links in the first allotter, and on the discovery of idle links thereat should effect transfer of the selecting operation thereto.

It is apparent that as the last idle link in the second allotter is seized, the last ground connection will be removed from marking conductor 583 and allotter access relay 1050 for the second allotter will restore. As the access relay 1050 restores, it is effective at its contacts 1051 to remove ground from the chain advancing lead 915 and no further chain advancement will be effected. As a result, the operating circuit for the upper winding of transfer relay 990 which is controlled by the chain will not be completed and transfer relay 990 will not be operated thereover.

The test for the presence of idle links in the first allotter is made in this case by the allotter access relay 1050. That is, the allotter relay 1050 at its contacts 1055 extends the marking conductor 587 for the first allotter to the allotter access relay 850 in the first allotter, and if idle links are available thereat, the ground which will be connected thereto will effect operation of the allotter access relay 850, the operating circuit therefor extending from negative battery over the winding of relay 850, contacts 868, conductor 889, contacts 1067, 1075, 1055, 1069, conductor 890, contacts 870, contacts 801 or alternatively contacts 831, contacts 882 to conductor 587 and the ground placed thereon by the idle links in the first allotter.

Allotter relay 850 operates, and at its contacts 851 initiates stepping of the equipment in search for an idle link in the manner heretofore described.

*Resume*

It is apparent from the foregoing that in A—B operation, the first allotter selects each of the available links associated therewith, and as it seizes the last of the available links in the sequence, it causes a test to be made as to the presence of idle links in either of the units.

A. If the test indicates idle units are available in the second allotter, the equipment transfers the selection operation to the second allotter unit. The nature of the transfer will differ slightly as noted earlier, depending upon the existence or non-existence of an idle link in the first allotter group at such time.

B. If the test indicates that there are no idle links in the second allotter and that there are idle links in the first allotter, the equipment starts a new cycle of the first allotter chain in search of an idle link.

C. In the event that there are no idle links in either of the two allotter units, the allotters are placed in a standby condition awaiting release of a busy link. An overload indication is made of subscriber calls attempted during such period.

D. As the second allotter is rendered effective, it operates to select each available link in sequence, and as it allots the last available link in the sequence, a test is made as to the condition of the links associated with both allotters. If there are links idle in the first allotter or in the first allotter and second allotter, the normal procedure is to effect transfer of the selection operation to the first allotter. The transfer is effected by different ones of the relays in accordance with the existence or nonexistence of idle links in the second allotter.

E. In the event that there are no idle links in the group associated with the first allotter and there are idle links associated with the second allotter, the second allotter unit is operated to effect selection of the idle equipment thereat.

F. In the event that there are no links idle in either allotter, the allotter is placed in a standby condition awaiting release of a busy link. An overload indication is made of calls attempted during this period.

*Seizure of link for extended time period*

Provision is made for effecting link bypass in the event that a seizing connection is maintained for longer than a predetermined period of time without effecting seizure of a link. Inasmuch as the bypass arrangements are an integral part of the allotter and the link guard circuit, it was necessary to consider such equipment in detail before discussing the link bypass apparatus.

The disclosure illustrates alternatively three embodiments for effecting such bypass arrangement by the guard circuit, each of which basically comprises means in the line guard circuit for transmitting a signal to means in the allotter either directly (X and Y wiring) or indirectly (W wiring) which effects bypass of the seized link and advancement to a further idle link.

*Link bypass in the event of fault occurrence following seizure of the link access relay—embodiment A—"W" Wiring*

In a first embodiment "W" wiring is utilized to transmit the bypass signals from the guard circuit to the allotter. With reference to the link guard circuit (Figure 6), it will be recalled that during idle periods the link guard equipment is restored, and the link bypass relay 675 is normally operated over a circuit extending from negative battery over the winding of relay 675, contacts 6601 and 611*a* to ground. As the selection operation is initiated by the link guard arrangement responsive to initiation of a call and seizure of a link, the tens marking switching relay 610 is operated, and the normal energizing circuit for the link bypass relay 675 is interrupted at contacts 611*a* to effect restoration of link bypass relay 675, the circuit being further interrupted as the units marking switching relay 660 is subsequently operated. The link bypass relay 675 is slow-to-release. After the elapse of a given time period, link bypass relay 675 restores, and at its contacts 676 interrupts the holding circuit for its slave relay 670. The link bypass relay 670 is also slow-to-release, the release characteristics of these two relays providing a period of time which is sufficient to effect normal link selection. If link selection is made within the normal time period, the line guard circuit restores and recompletes an energizing circuit to the bypass relay 670 and 675 before they can restore. However, if the link selecting equipment fails to select the link in the allotted period of time, relay 670 restores, and at its contacts 671 applies positive battery to the negative conductor 552 to effect energization of the connector link line relay 560*a* via lead 599 which operates to effect the operation of hold relay 570*a*. As relay 570*a* operates, it is effective at its contacts to 573*a* to interrupt the application of 60 ohm battery to the marking conductor 597*a*, which is associated with the link to indicate to the allotter that the link is busy (or more accurately, not available for use), whereby the stop relay 740 in the allotter will initiate stepping in the manner described to find an idle link which is available (or if all links are busy, to transmit to the calling subscriber an all-links busy signal).

*Embodiment B—"X" wiring*

A second arrangement is provided by connecting the equipment with the X-wiring designators, whereby the link by-pass signal is transmitted directly to the allotter by the line guard circuit.

With the arrangement thus connected, the signalling is accomplished by the link bypass relay 670 as it restores, it being effective at its contacts 671 to connect ground over conductor 691 and the "X" wiring to conductor 716 in the allotter circuit via contacts 858. Assuming the fault occurs during the period the first link is being selected, the first chain relay 570*a* and stopping relay 740 will be in the operated condition, and accordingly the bypass signal generated by link bypass relay 670 at its contacts 671 as it restores will be extended over contacts 858 and 753*a* to the stopping chain relay 750*b*. As the second stepping chain relay 750*b* operates it is effective at its contacts 756*b* to restore the first stepping relay 750*a*, and at its contacts 572*b* interrupts the holding circuit for stopping relay 740 which extended to the link which was seized. Stop relay 740 restores, and at its contacts 744 connects the allotter chain stepping circuit to the chain to cause it to search for a link in the normal manner. If the second link is idle, the stop relay 740 will operate and the link will be seized in the manner described heretofore. If the second link is not idle, stop relay 740 remains idle and the stepping proceeds under the control of the allotter chain advancing circuit.

As the allotter steps, the circuit to the link access relay 680 is interrupted and its release causes the link guard equipment to restore, the link bypass relay 670 reoperates to remove the guard signal extending to the allotter.

With two unit operation and a single guard circuit connected to serve both units, the pulse from the guard circuit is directed to a stepping lead 716 or 916 through contacts 858 or 1058 depending upon which of the relays 850 or 1050 is operated.

*Embodiment C—"Y" wiring*

In a third embodiment, the link bypass relays 670 and 675 are eliminated, and link bypass relay 600 and an associated RC network 604—606 are connected in lieu thereof. In such event, the link guard equipment will be connected to the allotter by the Y-wiring which, as shown, comprises signalling conductors 692 and 693.

In such arrangement, as the calling party initiates a call to operate the link access relay 680 associated with a preselected one of the links (in the illustrated example, link 1), link access relay 680 is operative at its contacts 680*a* to connect ground over resistor 607 to the winding of the link bypass relay 600, and also over contacts 602, condenser 604 and resistor 606 to negative battery. The link bypass relay 600 is a 10,000 ohm relay, and the capacitor is a 100 microfarad capacitor. Accordingly, with the connection of a ground to the circuit, the capacitor 604 begins to absorb a charge and the link bypass relay 600 will be inoperative. The charging constants of the circuit for the capacitor are chosen so that the period of time which will elapse before the capacitor is completely charged will be slightly greater than the period required by the link guard equipment to accomplish a normal link selecting operation.

In the event that the connection is established in a normal manner, the capacitor will not be completely charged at the time the link guard equipment is restored, and accordingly link bypass relay 600 will not be operated.

As the seized link indicates its busy condition to the allotter by removing battery from its marking conductor, such as 597*a*, the stop relay 740 restores and at its contacts 741, 742, interrupts the energizing circuit which extends over the upper winding of the differential relay 840. Since ground is still connected to the lower winding of relay 840, the relay operates briefly, and at its contacts 843, effects momentary connection of battery through contacts 857, conductor 693 through resistor 694 to the capacitor circuit to effect discharge thereof. Inasmuch as the operating ground for the lower winding of relay 840 is interrupted by the cut-off relay in the line circuit of the calling party, the relay 840 restores, the time period of its operation being insufficient to operate the fault detecting relays 800, 810 and 830.

With another call waiting to land and ground maintained on the start lead, relay 840 will be released (*a*) When another idle link is located in the same unit because of completion of a circuit through the upper winding of relay 840; and (*b*) When relay 850 is released because of transfer to the second unit or because of an all links busy condition.

In the event that the call is not completed within the time period required for the capacitor to assume the maximum charge, the operation of the link bypass relay 600 is effected and the link bypass relay 600 in its operation is effective at its contacts 603 to connect a ground signal over conductor 692 and the Y-wiring to conductor 617 via contacts 858 to effect the stepping of the chain in the same manner that the stepping was effected by the transmission of the signal over the X-wiring. The link bypass relay 600 is also operative at its contacts 601 to connect the capacitor 604 to a discharge circuit comprised of resistor 605 and contacts 601, whereby by the subsequent release of the link bypass relay 600, the capacitor is prepared for further timing operation and the selection of another idle link.

In the event of a single call, the brief operation of relay 840 might not be sufficient to completely discharge the condenser 604, which in such case continues to discharge through resistor 606, contact 604 and the winding of relay 600 during the idle period of the guard circuit.

*Failure in the allotter stepping chain*

The equipment is also operative in the event of the faulty operation of a member of the stepping chain in the allotter equipment to effect a forced transfer to the associated second allotter unit, and thereafter retransfer back to the first unit in search of whatever links can be reached in spite of the failure.

More specifically, assuming that the sixth relay **750*f* (not shown) of the stepping chain in the first allotter fails to operate as a call is trying to land, it is apparent that the chain will fail to step beyond the fifth relay 750*e* (not shown), and accordingly the incoming start lead 498 will not be extended to negative battery over the upper winding of differential relay 840, and the fault relays 840, 830, 810 and 800 will operate in the manner previously described to transmit a pulse to the stepping chain, with relay 830** restoring. Since the fault is in the allotter chain, the pulse transmitted by the fault relays will be ineffective and no chain operation will be accomplished thereby.

The differential relay 840 will, of course, remain operated in that the failure of the stepping chain to find an idle link will prevent the connection of negative battery to the circuit through the upper winding 840. It is noted that relay 800 at its contacts 803 completed an energizing circuit for relay 830 shunted by condenser 834 and 60 ohm resistor 835, which extends from contacts 841 over contacts 815, 806, 803, resistor 836 and the winding of relay 830 to negative battery. Thus, after the expiration of approximately another second, relay 830 reoperates, and with both fault relays 800 and 830 in the energized condition, contacts 801 and 831 are open and the energizing circuit for the allotter access relay 850 is interrupted and the relay is restored. With the restoration of relay 850, the first allotter is disabled and transfer is effected to the second allotter in the normal manner and the regular transfer tests are made. As relay 850 restores, it is effective at its contacts 854 to interrupt the energizing circuit which is extended through the lower coil of the differential relay 840 to effect the restoration thereof, which relay at its contacts 841 interrupts the holding circuit for relays 800, 810 and 830. Thus, transfer back to the first allotter unit may be accomplished in a normal manner when rotation is completed in the second unit, and the equipment in the first allotter unit will be operative to search for whatever links might be available in the sequence prior to the particular one of the stepping relays in the chain which is inoperative; or if no links are idle in the second unit, recycling can occur in the first unit.

*Transfer in the event of interruption of power supply in one allotter*

In a further protective arrangement illustrated in Figure 12, transfer from one allotter to the other allotter is effected in the event of the interruption of the power supply to the guard circuit to the allotter circuit, or to the allotter transfer circuit.

Specifically, with reference to Figure 12, there is shown thereat a grasshopper fuse arrangement 1200 connected in the power supply for the guard circuit, allotter, and allotter transfer equipment. A fault detecting relay 1210 is connected to the grasshopper fuse terminals whereby with the blowing of the fuse in the line finder guard circuit, the allotter circuit or the allotter transfer circuit, an obvious operating circuit will be completed for the fault detecting relay 1210, which operates, and at its contacts 1211 interrupts the circuit extending from the associated links over the marking lead 587 to the allotter access relay 850. Relay 850 is accordingly restored. As the allotter access relay 850 restores, the allotter is placed on lock-out in an obvious manner, and the selecting operations of the system will be transferred to the associated allotter unit.

When relay 1210 operates it closes contacts 1212 paralleling contacts 793 of relay 790 so that relay 1050 can operate even though 790 is disabled. Similarly for the second unit.

*Alarm signalling*

Certain features included in Figures 6, 8, 10 and 12, but not mentioned previously provide means for effecting alarm indications (audible or visual) in case of various guard circuit or allotter circuit failures.

Specifically, the operation of relay 600 (Y-wiring) at contact 608, [or the release of relay 670 (W or X-wiring), at contacts 672] due to a guard circuit failure, will close circuits to associated alarm relay LFA (Figure 12) over lead 804'. Likewise a circuit may be closed to relay LFA with the operation of relay 810 in the allotter transfer circuit via lead 804' as previously mentioned.

The operation of fuse alarm relay FMA also closes an obvious circuit to relay LFA. Relay LFA extends its operating circuit to the common alarm circuit of the switchboard, whereas an alarm relay LA operates and provides locking ground for itself and LFA. LFA also lights a line-finder unit alarm lamp. Relay LA provides alarm signals in a conventional manner.

*Conclusion*

There has been set forth hereinbefore a novel telephone system which is extremely flexible in its application and which is readily expandable to handle traffic loads of variable sizes. Further, each of the switches in the novel telephone system are extremely compact in their arrangement and utilize a minimum number of component members, whereby the improved arrangement is provided at a minimum cost. The present arrangement also provides an allotter in which a small number of relays are normally operated conserving current.

Thee and other features of the invention which are believed to be new are set forth in the accompanying claims.

What is claimed is:

1. In an automatic telephone system, a group of subscriber lines, a first group of links connected to have access to said subscriber lines, a first allotter unit connected to preselect, in sequence, idle ones of said links for use by calling subscribers; line circuit means for each line operative in response to initiation of a call by its associated line to effect seizure of an idle preselected link, guard means for controlling connection of the link to the line, means in the link operatively controlled by said guard means to signal the allotter to select the next idle link in the sequence for use by the succeeding calling subscriber; a second group of links, a second allotter unit and a second guard circuit connected to control connection of said lines to said second group of links, means for connecting said second allotter to said first allotter, and means for controlling said first and second allotters to operate in a given sequence to preselect idle links of said first and second groups for use by calling ones of said subscribers.

2. A system as set forth in claim 1 which includes means for altering the sequence of operation of said allotters relative to each other.

3. A system as set forth in claim 1 which includes means for rendering one of said guard circuits ineffective and for connecting the other one of said guard circuits for use with both groups of links.

4. In an automatic telephone system, a group of subscriber lines, a plurality of links connected to have access to said subscriber lines, an allotter unit connected to preselect in sequence the idle ones of said links for calling subscribers, line circuit means for each line operative in response to initiation of a call by its associated line to seize an idle link as preselected by said allotter means, guard means for controlling connection of the link to the line, signalling means for said guard means operative in response to the expiration of a predetermined period of time following initiation of link seizure by a line circuit without having effected connection of the link to the calling subscriber line, and means in said allotter directly controlled in response to operation of said signalling means to bypass the preselected link and advance in search of a further idle link for use by the calling subscriber.

5. An arrangement as set forth in claim 4 in which said signalling means includes means connecting said allotter directly to said guard circuit timing means, and means in said allotter operative with receipt of a signal over said direct connection to bypass the seized link and to advance in search of a further idle link.

6. In an automatic telephone system, a group of subscriber lines, a group of links connected to have access to said subscriber lines, an allotter unit connected to preselect in sequence idle ones of said links for use by calling subscribers, line circuit means for each line operative in response to initiation of a call by its associated line to effect seizure of an idle preselected link, guard means for controlling connection of the link to the line including a single group of relays operative to first register the tens group of the calling line, means for clearing said registration, and means for thereafter effecting the registration of the units designation of the calling line on said same relay group, means in the link operatively controlled by the guard circuit to signal said allotter to select another idle link for use by the next calling subscriber, and means in said allotter unit operative to effect release of said guard circuit thereafter.

7. In an automatic telephone system, a group of subscriber lines divided into groups, a group of links connected to have access to said subscriber lines, an allotter unit connected to preselect in sequence idle ones of said links for use by calling subscribers, line circuit means including a P-wire circuit for each line operative in response to initiation of a call by its associated line to effect seizure of an idle preselected link, guard circuit means for controlling connection of the seized link to the calling line, means operative with initiation of a call to connect marking potential to the P-wire circuit of the calling line to identify the calling line in the tens group to the guard circuit, means in the seized link operated by said guard circuit to connect the P-wire circuits of the group of lines associated with the calling line to the guard circuit, means in said guard circuit for selecting the calling line therefrom and effecting connection of the link thereto, and means in the guard circuit operative to seize the desired link prior to connection of the calling line thereto.

8. In an automatic telephone system for servicing a number of subscriber lines which are divided into groups, a line circuit for each of said subscriber lines including a group marking lead and P-wire circuit, a plurality of links, call extending equipment including a guard circuit and an allotter circuit for preselecting idle links for use by the subscribers, means in said line circuit for seizing one of said preselected links, means in said line circuit simultaneously operative to mark said group marking lead and said P-wire circuit to provide an indication as to the group and member of the group which is initiating the call, and means for simultaneously extending the P-wire circuits of the calling line group to the associated guard equipment.

9. In an automatic telephone system, a plurality of subscriber lines, each of which includes a P-wire circuit, a finder switch including means for connecting the calling ones of the subscriber lines to call extension equipment, means for marking the P-wire circuit of a calling line with initiation of a call thereover, guard circuit means, means for extending the P-wire circuits of the calling line group simultaneously to said guard circuit, selection means in said guard circuit for selecting the marked one of said P-wire circuits, and means controlled by said selection means to control said finder switch to select the line having said marked P-wire circuit.

10. In an automatic telephone system including a plurality of subscriber lines and having a finder switch including tens and units relays for connecting calling ones of the subscriber lines to call extension equipment, a guard circuit including a number of relay members, means for connecting said relay members to operatively determine the tens group of the calling line responsive to initiation of a call, means controlled by said relay members on determination thereof to operate the corresponding tens relay in the finder switch, means for connecting the same relay members which determine the tens group of the calling line to operatively determine the calling one of the lines of the selected tens group, and means controlled thereby to effect operation of the corresponding units relay.

11. In an automatic telephone system, a plurality of subscriber lines, a plurality of finder switches each including tens and units relays for connecting the calling ones of the subscriber lines to call extension equipment, tens marking and units marking means for each line, means operative with initiation of a call over a line to mark the tens and units marking means corresponding to the calling line, a guard circuit, means for simultaneously connecting the tens marking means for the lines to said guard circuit responsive to initiation of a call, detector means in said guard circuit for determining the marked one of the tens marking means and operating the finder tens relay corresponding thereto, means operatively controlled by the operated one of the finder tens relays to simultaneously connect the units marking means for the selected tens group of lines to said guard circuit, and means in said guard circuit including said detector means for operating the corresponding units relay in the finder switch.

12. In an automatic telephone system, a plurality of subscriber lines, each of said lines having a P-wire circuit, a plurality of finder switches each including tens and units relays for connecting the calling ones of the subscriber lines to call extension equipment, a tens marking conductor for each group of ten lines, means operative in response to initiation of a call over a line to mark the tens marking conductor and P-wire circuit for the calling line, a guard circuit, means for simultaneously connecting the tens marking conductors to said guard circuit, detector means in said guard circuit for determining the marked one of the tens marking conductors and operating the finder tens relay corresponding thereto, means operated by said finder tens relay to extend simultaneously the P-wire circuits of the lines for the selected tens group to said guard circuit, and means in said guard circuit including said detector means operative to determine the marked one of said P-wire circuits and to effect operation of the corresponding units relay in the finder switch.

13. In an automatic telephone system, a plurality of subscriber lines, each of said lines having a P-wire circuit, a plurality of finder switches each including tens and units relays for connecting the calling ones of the subscriber lines to call extension equipment, a tens marking conductor for each group of ten lines, means operative in response to initiation of a call over a line to mark the tens marking conductor and P-wire circuit for the calling line, a guard circuit, means for connecting the tens marking conductors to said guard circuit, register means in said guard circuit for determining and registering the tens group of the calling line as indicated by the marked one of the conductors, means controlled by said register means to operate the finder tens relay corresponding to the registered tens group, means for clearing said register means of the tens group information registered thereby, means operatively controlled by the operated one of the finder tens relay to thereafter extend the P-wire circuits for the lines associated with the selected tens group to said register, means controlled by said register means to determine and register the calling line of the tens group thereon, means controlled in response to said registration to effect operation of the corresponding units relay in the finder switch, and means operative to effect release of said guard circuit and clearing of said register means thereafter.

14. An automatic telephone system as set forth in claim 13 in which said guard circuit restoring means comprises means in the call extension equipment operative to signal the link over the allotter circuit responsive to the extension of a connection thereto, and means in said link responsive to said signal to effect release of the guard circuit.

15. An automatic telephone system as set forth in claim 13 in which said line finder switch is connected for seizue by a plurality of line circuits over a common start lead, and which includes means in said call extension equipment operative to signal the line finder switch with the extension of a connection thereto, and means in said line finder switch effective to restore said guard circuit for further use.

16. In an automatic telephone system, a first and a second group of subscriber lines, a first group of links normally connected to have access to said first group of lines, a second group of links normally connected to have access to said second group of lines, a first allotter unit connected to select idle links in said first link group for use by said first group of subscribers, a second allotter unit connected to select idle links in said second link group for use by said second group of subscribers, and means operative to connect said first and second allotters to select idle ones of said links in a predetermined sequence for use by both of said subscriber groups.

17. In an automatic telephone system, a first and a second group of subscriber lines, a first group of links connected to have access to said first group of lines, and a second group of links connected to have access to said second group of lines, a first allotter unit connected to select idle links in said first link group for use by said first group of subscribers, and a second allotter unit connected to select idle links in said second link group for use by said second group of subscribers, switch means for operatively connecting said allotters to operate successively in the selection of idle links from both link groups for use by both of said subscriber groups, and means operative in response to movement of said switch means to a first position to control said first allotter unit to operate first in the selecting operation, and operative in response to movement thereof to a second position to control said second allotter to operate first in the selecting operation.

18. In an automatic telephone system, a plurality of subscriber lines, a first and a second group of links, means connecting each of said links to have access to associated ones of said subscriber lines, a first and a second allotter unit, means connecting each of said allotters for access to its associated link group, means in each of said allotters operative to control same to select idle ones of its associated links in a given cyclic sequence for calling ones of said subscriber lines, means operative in response to the completion of a cycle by an allotter to determine the condition of the links in the groups for each of said allotters, and means operative to determine the allotter to be next operated to search for an idle link in accordance with the condition of the links in each of the allotters at the time of the test and the predetermined sequence of operation pre-established for the allotters.

19. In a telephone system having a plurality of subscriber lines and a plurality of links preassigned for connection to said subscriber lines; a first and a second allotter unit, each of said allotter units having a given group of said links connected for selection thereby, means for energizing each allotter to search for idle ones of its associated links in a given cyclic manner and to allot same for use by calling subscribers, testing means operatively controlled subsequent to sequential allotment of the idle ones of the links in one of the allotter units to test for the existence of an idle link in the other of said allotter units, and means operative in response to detection of an idle link in the other allotter unit to transfer the allotting function to the other of said allotters.

20. An arrangement as set forth in claim 19 in which each of said allotter units includes means for indicating the presence of idle links in the group preassigned thereto and in which said testing means includes a transfer relay in the first allotter operatively connected to test the indicating means of the second allotter as a cycling operation is completed by the first allotter to determine the availability of links preassigned to the second allotter, an access relay member in the second allotter operatively controlled responsive to said test by said transfer relay in said first allotter whenever links are idle in the second allotter, and means controlled by the access relay in the second allotter in its operation responsive to said test to transfer the allotting function to the second allotter.

21. An arrangement as set forth in claim 19 in which each of said allotter units includes means for indicating the presence of idle links in the group preassigned thereto, therewith and in which said testing means in the first allotter include a transfer relay operatively connected to test the indicating means for said second allotter to determine the availability of links therein, an access relay member in the first allotter operatively controlled responsive to an all links busy condition in the group of links preassigned to the first allotter, and means controlled by said access relay to extend the indication means of the second allotter to said transfer relay to effect transfer of the allotting function to the second allotter in response to the discovery of idle links in that group.

22. An arrangement as set forth in claim 19 in which each of said allotter units includes means for indicating the presence of an idle link in the group preassigned thereto, and in which said testing means includes a transfer relay member in the second allotter, and in which said testing means is operative as the cycling of the second allotter is completed to test the indicating means of the first allotter to determine the availability of links thereat, access relay means in said second allotter operatively controlled by said transfer relay, means controlled by said access relay to effect transfer of the allotting function to said first allotter, and access relay means in said first allotter operatively controlled by said access relay in said second allotter in response to the detection of idle links in the group assigned to the first allotter to actuate the first allotter to cause it to search for an idle link in the group assigned thereto.

23. An arrangement as set forth in claim 19 in which each of said allotter units includes means for indicating the presence of an idle link in the group preassigned thereto, and in which said testing means includes a transfer relay member in the second allotter operative as the cycling of the second allotter is completed to test the indicating means of the first allotter to determine the availability of links thereat, access relay means in said second allotter controlled by said transfer relay to effect transfer of the allotting function to said first allotter in response to the detection of allotter links in said first and second allotters, and access relay means in said second allotter for operatively controlling said first allotter access relay means to effect transfer of the allotting function to said first allotter independent of said second allotter transfer relay responsive to the detection of idle links only in said first allotter by said first allotter access relay.

24. In a telephone system having a plurality of subscribers and a number of links connected for use by said subscribers in establishing calls, a first and a second allotter unit, each of said units having a predetermined group of said links connected for selection thereby, means for energizing each allotter to search for idle one of its associated links in a given cyclic manner, means operatively controlled by each allotter in response to completion of each cycle to test for the existence of an idle link in its own group and in the group connected for selection by the other allotter, and means operative in response to failure to detect an idle link, in the other allotter, and in response to the successful detection of an idle link in its own associated group, to effect recycling of itself in search of one of the associated idle links.

25. In a telephone system having a plurality of subscribers and a number of links connected for use by said subscribers, a first and a second allotter unit, each of said allotter units having an individual group of links connected for selection thereby, indicating means for each allotter unit operative to indicate the availability of an idle link in its associated group, means in each allotter unit operative in response to energization thereof to allot idle ones of its associated links in a given cyclic manner, means in each allotter unit operative in response to completion of a cycle thereby to test said indicating means for both allotter units to determine the availability of an idle link in either of said allotter units, and means operative in response to determination of the existence of an idle link in the other allotter to transfer the allotting function thereto.

26. In a telephone system having a plurality of subscribers and a number of links connected for use by said subscribers, a first and a second allotter unit, each of said allotter units having an individual group of links connected for selection thereby, indicating means for each allotter unit operative to indicate the availability of an idle link in its associated group, means for each allotter unit operative in response to energization thereof to allot idle ones of its associated links for use by calling subscribers in a given cyclic manner, means for each allotter unit operative in response to completion of a cycle thereby to test said indicating means for both allotter units to determine the availability of an idle link in either of said allotter units, and means operative to indicate an all links busy condition to the calling subscribers whenever said indicating means for both of said allotters indicate that the links in both of said allotters are busy.

27. In a telephone system having a plurality of subscribers and a number of links connected for use by said subscribers, a first and a second allotter unit, each of said allotter units having an individual group of links connected for selection thereby, indicating means for each allotter unit operative to indicate the availability of an idle link in its associated group, means for each allotter unit operative to allot idle ones of its associated links for calling subscribers in a given cyclic manner, means associated with each allotter unit operative in response to completion of a cycle thereby to test said indicating means for both allotter units to determine the availability of an idle link in either of said allotter units, means operative to indicate an all links busy condition to the calling subscribers responsive to said indicating means indicating that all the links in both of said allotters are busy, and means operative in response to the subsequent release of a link to the idle condition to render effective the particular one of the allotters having such link connected for selection thereby to allot same for use.

28. In a telephone system having a plurality of subscribers and a number of links connected for use by said subscribers, a first and a second allotter unit, each of said allotter units having an individual group of links connected for selection thereby, indicating means in each allotter for indicating the availability of an idle link in the group connected for selection thereby, means in each of the allotter units operative as actuated to effect the preselection of an idle one of its links for use by a calling subscriber, means in each allotter unit operative responsive to seizure by a subscriber of a link preselected thereby to examine and preselect the next idle link in the sequence for use by a subsequent calling subscriber, and relay testing means in each allotter operated as the allotter completes the sequential selection of its idle links to test said indicating means for the existence of an idle link in the link group for each of said allotter circuits; and means controlled thereby to actuate one of said allotters in accordance with the indicated location of the idle links.

29. In an automatic telephone system, a first and a second group of subscriber lines, a first group of links normally connected to have access to said first group of lines, a second group of links normally connected to have access to said second group of lines, a first allotter unit connected to select idle links as available in said first link group, a second allotter unit connected to select idle links as available in said second link group, indicating means for each of said links operative to indicate the availability of its link to the associated allotter, stepping means in each allotter operative to sequentially test the indicating means for the links of its associcated group and to sequentially select each idle link for use, and means operative to cause stepping means to bypass the remaining steps in the sequence responsive to the failure of said stepping means.

30. In an automatic telephone system, a first and a second group of subscriber lines, a first group of links normally connected to have access to said first group of lines, a second group of links normally connected to have access to said second group of lines, a first and a second allotter unit, each of said allotters having a predetermined one of said link groups connected for selection thereby, marking means for indicating the availability of each link to the allotter, stepping means in each allotter operative in sequence to test the marking means for each of the links of its associated group; indicating means for each of said allotters operative to indicate the availability of an idle link in the group connected for selection thereby, testing means operative in response to the completion of a cycle of an allotter to test said indicating means for both allotters to determine the allotter to be next cycled, and fault detecting means operative responsive to the failure of the stepping means to attempt transfer to the second allotter unit and alternatively recycling of the first allotter unit.

31. An arrangement as set forth in claim 30 in which said testing means for each allotter actuates means for transferring the allotting function to the other allotter in the event that a test following an allotter cycle indicates that links are available in the other allotter, and in which said testing means are operative to effect recycling of the first allotter in the event that the test indicates that no links are available in the other allotter and that associated links in the first allotter are in the idle condition, whereby use of the links associated with the steps prior to the step at which the fault occurred may be effected.

32. In an automatic telephone system, a group of subscriber lines, a first group of links connected to have access to said lines, a first allotter unit connected to select idle ones of said links for use by calling ones of said lines, a second group of links, a second allotter unit connected to select idle ones of said second group of links for use by calling ones of said lines, guard means including a relay circuit for preventing simultaneous selection of more than one of said links at any given time, timing means in said guard means operative to time the off-normal period of the guard means, means controlled by said timing means operative to signal the effective allotter to bypass a selected link and to search for another idle link whenever connection of the off-normal period exceeds a predetermined period of time, and means operative to reset said guard timing means for a further timing operation following the completion of each line-link connecting operation.

33. In an automatic telephone system, a group of subscriber lines, a group of links connected to have access to said lines, an allotter unit connected to select idle ones of said links for use by calling ones of said lines, guard means including a relay circuit for preventing the simultaneous selection of more than one of said links at any given time, timing means in said guard means for timing the process of connecting a calling line to a selected link which comprise slow-to-release relay means, and means controlled by said relay means to send a signal directly to said allotter equipment in response to expiration of a time period greater than determined by the slow-to-release characteristics of said relay means; and means in said allotter operative responsive to receipt of said signal to bypass the seized link and to advance in search of another idle link for use by the calling line.

34. In an automatic telephone system, a group of subscriber lines, a group of links connected to have access to said lines, an allotter unit connected to select idle ones of said links for use by calling ones of said lines, guard means including a relay circuit for preventing the simultaneous selection of more than one of said links at any given time, timing means in said guard means for timing the extension of a connection of a calling line to a link as seized for operation comprising a relay member, a resistance-capacitor network operative to measure a predetermined period of time and effective thereafter to control operation of said relay member, means controlled by said relay member in its operation to transmit a bypass signal to said allotter, and means in said allotter operative responsive to receipt of said signal to bypass the seized link and to search for another idle link for use by the calling party.

35. In an automatic telephone system, a plurality of subscriber lines, a first and a second group of links, means connecting each of said links to have access to each of said subscriber lines, a first and a second allotter unit, means connecting each of said allotters for connection to the links of a preassigned one of said groups, means in each of said allotters operative to control same to select idle ones of its associated links in a given cyclic sequence for calling ones of said subscriber lines, means for energizing said allotters in a predetermined sequence, and guard circuit means for controlling connection of each calling line to the idle link preselected by the effective one of said allotters.

36. An automatic telephone system as set forth in claim 35 in which said guard circuit means include a first and a second guard circuit, and means for detachably interconnecting said first and second group of lines, said first and second allotter circuits, and said first and second guard circuits; whereby the various equipment groups may be conveniently separated to constitute a plurality of discrete telephone systems.

37. In an automatic telephone system including a plurality of subscriber lines and equipment for connecting calling ones of the subscriber lines to multiple stage call extension equipment, a guard circuit including a number of relay members, means for connecting said relay members to register the tens group of the calling line responsive to initiation of a call, means for utilizing said registration to operate said call extension equipment in the extension of the line over one stage thereof, means for clearing said register, means for registering on said same relays which register the ten relays, the units designation of the calling line, and means controlled in response to the registration of the units digit on the same relay group to effect further operation of said corresponding call extension equipment in the extension of the calling line over a subsequent stage thereof.

References Cited in the file of this patent

UNITED STATES PATENTS

| | | |
|---|---|---|
| 1,849,694 | Saunders | Mar. 15, 1932 |
| 2,133,415 | Baker et al. | Oct. 18, 1938 |
| 2,289,896 | Bakker | July 14, 1942 |
| 2,513,426 | Lomax | July 4, 1950 |
| 2,513,964 | Pearce et al. | July 4, 1950 |
| 2,572,027 | Horwitz | Oct. 23, 1951 |
| 2,650,950 | Kessler | Sept. 1, 1953 |
| 2,714,628 | Boswau | Aug. 2, 1955 |

FOREIGN PATENTS

| | | |
|---|---|---|
| 757,025 | Great Britain | Sept. 12, 1956 |